United States Patent
Christel et al.

(10) Patent No.: US 7,886,663 B2
(45) Date of Patent: Feb. 15, 2011

(54) METHOD AND DEVICES FOR REDUCING VIBRATION

(75) Inventors: Ralf Christel, Schlüsselfeld (DE); Oliver Frank Hahn, Veitshöchheim (DE); Karl Erich Albert Schaschek, Thüngen (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 827 days.

(21) Appl. No.: 11/791,970

(22) PCT Filed: Dec. 9, 2005

(86) PCT No.: PCT/EP2005/056644

§ 371 (c)(1),
(2), (4) Date: May 31, 2007

(87) PCT Pub. No.: WO2006/061432

PCT Pub. Date: Jun. 15, 2006

(65) Prior Publication Data

US 2007/0295230 A1     Dec. 27, 2007

(30) Foreign Application Priority Data

Dec. 10, 2004   (DE)   ........................ 10 2004 059 849

(51) Int. Cl.
*B41F 13/26* (2006.01)
(52) U.S. Cl. ........................ 101/216; 101/219
(58) Field of Classification Search .................. 101/219
See application file for complete search history.

(56) References Cited

U.S. PATENT DOCUMENTS

| | | | | |
|---|---|---|---|---|
| 1,417,652 A | * | 5/1922 | Wood | .................. 101/219 |
| 2,691,328 A | * | 10/1954 | Evers | .................. 101/247 |
| 4,195,568 A | * | 4/1980 | Fischer | .................. 101/216 |
| 4,905,598 A | | 3/1990 | Thomas et al. | |
| 5,201,586 A | * | 4/1993 | Zimmermann et al. | ........ 100/47 |
| 6,032,558 A | * | 3/2000 | Michler | .................. 101/216 |
| 6,138,629 A | * | 10/2000 | Masberg et al. | .......... 123/192.1 |
| 6,156,158 A | | 12/2000 | Kustermann | |
| 6,389,941 B1 | * | 5/2002 | Michler | .................. 101/216 |
| 6,668,719 B2 | * | 12/2003 | Reder et al. | .................. 101/216 |

(Continued)

FOREIGN PATENT DOCUMENTS

DE    196 52 769 A1    6/1998

(Continued)

*Primary Examiner*—Jill E Culler
(74) *Attorney, Agent, or Firm*—Jones, Tullar & Cooper, P.C.

(57) ABSTRACT

Vibrations of a cylinder, which is a part of a web-processing machine, and particularly a printing machine, are dampened. A functional correlation is determined for a course of a force of a channel passage through a nip point defined by the cylinder and a second cylinder. The functional correlation is pre-defined up to a scaling factor determining the height as a time course for an actuator force time course and is stored in a control or a regulating device. The vibration, or an amplitude of the vibration is measured during the operation of at least part of the cylinder by the use of a sensor. A maximum vibration amplitude on the roll body of the cylinder is then calculated from the measuring value. The actuators are controlled by the control or regulating device according to the pre-defined actuator force time course.

16 Claims, 10 Drawing Sheets

U.S. PATENT DOCUMENTS

| | | | |
|---|---|---|---|
| 7,011,023 B2 | 3/2006 | Dittenhofer et al. | |
| 7,017,483 B2 | 3/2006 | Bolza-Schunemann | |
| 7,040,225 B2 | 5/2006 | Bolza-Schunemann | |
| 2001/0042466 A1* | 11/2001 | Forch | 101/216 |
| 2004/0107849 A1* | 6/2004 | Christel et al. | 101/247 |
| 2005/0081728 A1* | 4/2005 | Bolza-Schunemann | 101/216 |

FOREIGN PATENT DOCUMENTS

| | | |
|---|---|---|
| DE | 200 11 948 U1 | 1/2001 |
| DE | 101 07 135 A1 | 8/2002 |
| DE | 101 45 322 A1 | 4/2003 |
| DE | 102 04 322 C1 | 4/2003 |
| DE | 102 55 334 A1 | 8/2003 |
| DE | 102 53 997 C1 | 12/2003 |
| EP | 0 331 870 A2 | 9/1989 |
| JP | 62228730 A | 10/1987 |
| WO | WO 97/03832 | 2/1997 |
| WO | WO 03/064763 A1 | 8/2003 |

* cited by examiner

METHOD AND DEVICES FOR REDUCING VIBRATION

CROSS-REFERENCE TO RELATED APPLICATIONS

This application is the U.S. national phase, under 35 USC 371, of PCT/EP2005/056644, filed Dec. 9, 2005; published as WO 2006/061432 A1 on Jun. 15, 2006, and claiming priority to DE 10 2004 059 849.5, filed Dec. 10, 2004, the disclosures of which are expressly incorporated herein by reference.

FIELD OF THE INVENTION

The present invention is directed to a method and to devices for vibration reduction. Vibration is reduced in a cylinder of a web-processing machine. At least one actuator acts on the cylinder, or on a journal for the cylinder.

BACKGROUND OF THE INVENTION

A method and a device for reducing vibrations is known from DE 102 53 997 C1. A raised portion, in the area of the shell face, of a rotating component can be changed in its height and/or in its position.

WO 03/064763 A1 discloses a method and a device for reducing vibrations. Journals and/or bearings are acted upon by actuators. In this case, a signal path, which is preset as a function of an angular position of the components, is acted upon, wherein the preset control signals can be adaptively matched.

A method for damping contact vibrations is disclosed in DE 196 52 769 A1. Actuators are provided, which act on the bearing or the journal, and which are operated via a control circuit for vibration damping.

EP 03 31 870 A2 discloses an arrangement for the seating of cylinders. Journals of a cylinder are seated in two bearings which are arranged side-by-side in the axial direction of the cylinder. The bearings can be individually perpendicularly moved, with respect to the axis of rotation, by pressure cylinders, such as, for example, for compensating for cylinder bending.

A bearing arrangement for a cylinder of a printing press is known from DE 200 11 948 U1. Piezo-electric actuating elements are arranged between the outer ring and a bore in the frame for exact positioning of the bearing.

In JP 62-228730 A, vibrations of a rotating shaft are reduced by the use of piezo elements.

A method for vibration damping of a cylinder of a printing press is known from DE 101 07 135 A1. Forces counteracting the vibration are produced by an actuator and are controlled, in regard to their strength and direction, as a function of the actually measured vibrations. An adaptive counter-control can be used here, in which the repeated deviation per revolution of the cylinder is measured, and the respectively remaining deviation is evaluated by the use of an algorithm which is fixed in place and which is assigned in accordance with the angular position of the cylinder, and which is compensated by triggering the actuator.

SUMMARY OF THE INVENTION

The object of the present invention is directed to providing a method and devices for vibration reduction.

In accordance with the present invention, this object is attained by the provision of at least one actuator that is usable to apply either a direct or an indirect force to a cylinder, or to a journal of a cylinder of a web-processing machine. The cylinder is seated with its journal in a linearly movable bearing block which supports radial bearings. The actuator may be integrated into the linearly movable block. A control assembly is used to operate the actuator.

The advantages which can be obtained by the present invention consist, in particular, in that the required rapid reaction times and high dynamics are achieved by the pre-control with a predefined force progression. By the predetermination of a signal course, which is matched to the groove beat, of the force push that is to be generated by the actuator, only a matching of the signal strength is required.

It is also of great advantage that, besides the groove beat, the excitation by the actuator itself is included in the calculation algorithm. It is possible by the use of this, to reduce the vibrations as a whole, i.e. to also reduce modes of vibration which are caused by the actuator itself. Otherwise, there is the danger that, although a characteristic mode of the cylinder vibration, which is caused by the groove beat is reduced, a mode which is caused by the actuator is increased.

It is also of considerable advantage that, in particular taking into consideration the vibration which is theoretically generated by the groove beat, as well as that which is created by an actuator, a conclusion is drawn regarding a highest amplitude present at the cylinder from the measured value at a fixed location in the cylinder-journal system. This is made the basis of an iterative matching of the pulse strength. The measured value alone would only depict a portion, and would therefore lead to considerably erroneous conclusions.

The method can be performed particularly advantageously by the use of bearing arrangements in which an actuator acts indirectly, such as via a radial bearing or a bearing block having a radial bearing, or directly on a cylinder journal. In this case, the assurance of a high degree of dynamics is of particular importance which, in an advantageous embodiment, is achieved by the employment of a piezo actuator. In an embodiment with hydraulically operated actuators, this can be achieved by the arrangement of quick-acting control valves in the hydraulic system.

A configuration of a bearing arrangement, in which the respective cylinder can be placed against or away from a second cylinder in linear bearings, is of particular advantage in view of short actuating paths and simple mounting. In this case, the linear bearing elements, the rotary bearing, as well as the actuator which compensates for vibrations, are preferably arranged as a module in a bearing unit which can be mounted as a unit.

In an embodiment of the present invention, in which an actuator that is opposing the vibration is different from an actuator that is providing an actuating movement, it is advantageous to integrate the first-mentioned actuator in the movable part of the bearing. Because of this, the effect of the first mentioned actuator remains independent of a contact or a non-contact position.

BRIEF DESCRIPTION OF THE DRAWINGS

Preferred embodiments of the present invention are represented in the drawings and will be described in greater detail in what follows.

Shown are in:

FIG. 1, a top plan view of a double printing group, in

FIG. 2, a schematic representation of a nip passage, in

DESCRIPTION OF THE PREFERRED EMBODIMENT

Figure 1:
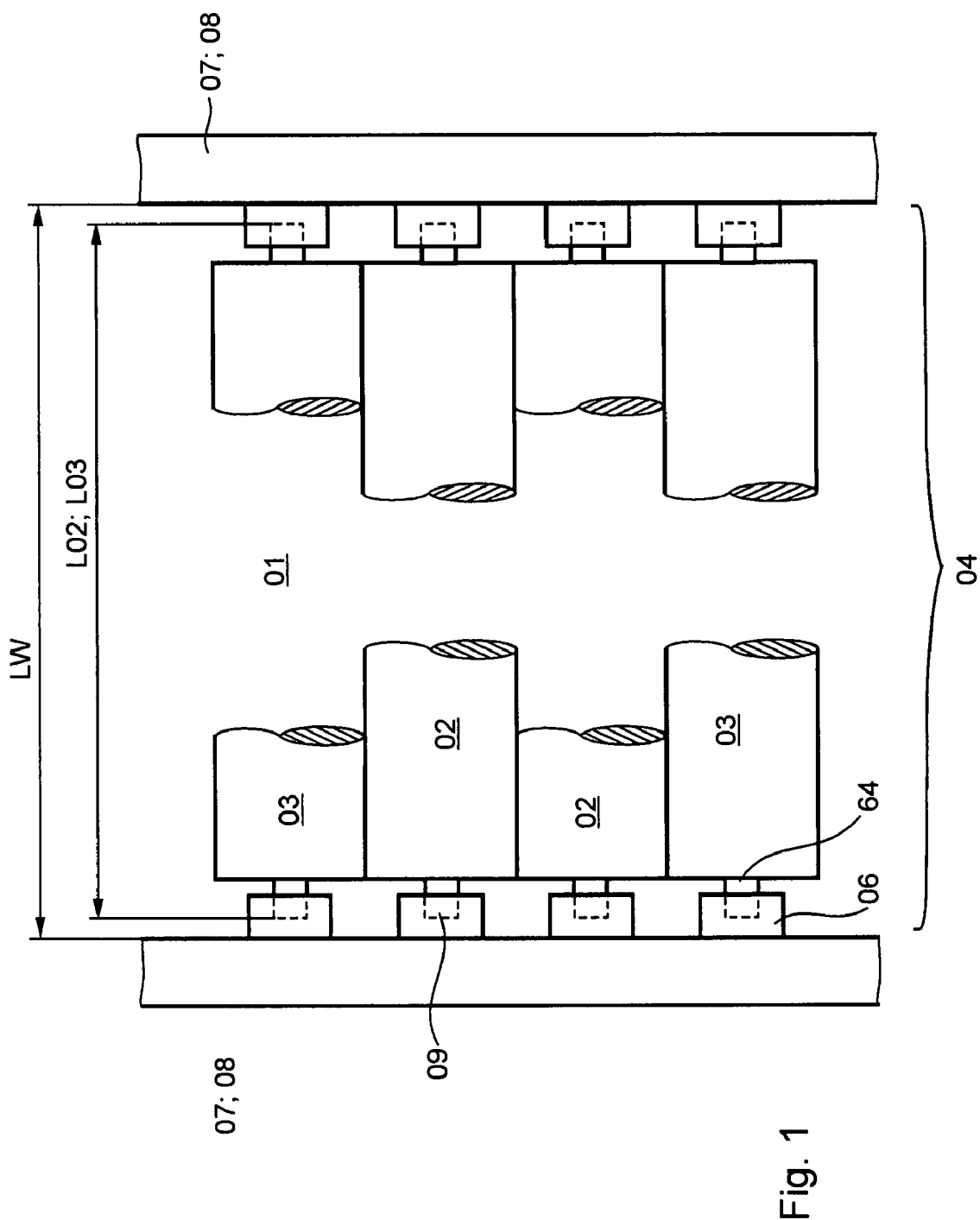

A printing press, such as, for example, a web-fed rotary printing press, and in particular a multi-color web-fed rotary printing press, has a printing unit, in which a web of material, a web for short, can be imprinted on one or on both sides. The printing unit has a printing group 01 with at least one cylinder 02, 03, which can be brought into and out of contact. In this case, the printing unit is a double printing group 01 for use in printing on both sides of a web, in a rubber-to-rubber operation, as shown in FIG. 1. The double printing group 01, in the form of bridge or n-printing groups, or also as a level printing group with axes of rotation located in a common plane, is in the depiction of FIG. 1, constituted by two printing groups 01, each of which has a cylinder 02, 03, which are embodied as a transfer cylinder 02 and as a forme cylinder 03, such as, for example, as printing group cylinders 02, 03, as well as a non-represented inking unit and, in the case of wet offset printing, additionally a dampening unit. In the contact position depicted in FIG. 1, a double print position is respectively formed between the two transfer cylinders 02.

Figure 2:
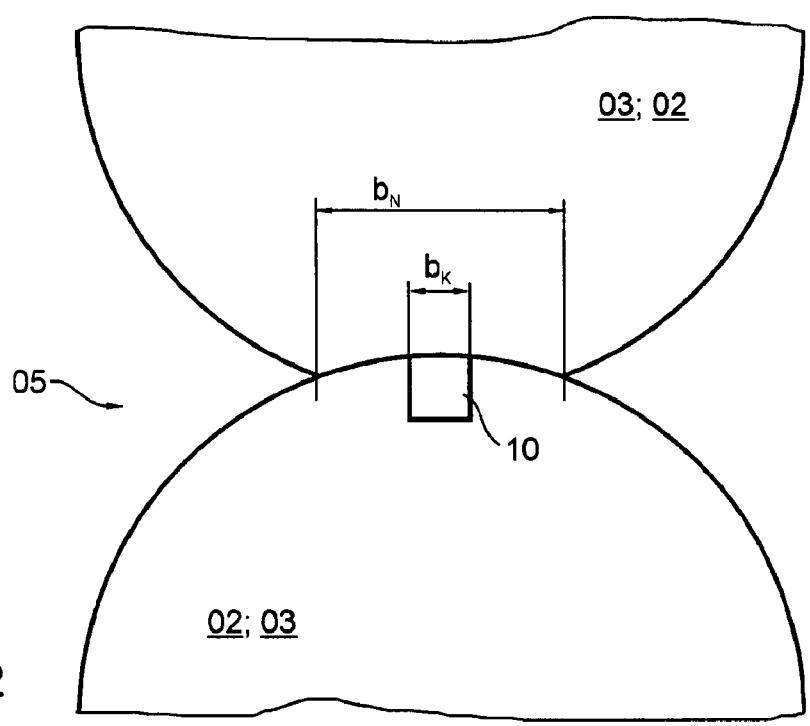

The cylinders 02, 03 are each respectively rotatably seated, at their respective ends, on, or in lateral frames 07, 08. At least one of the two cylinders 02, 03 forming a nip point 05 has, in the area of its shell face, at least one axially extending groove 10 of a width $b_K$, as seen in FIG. 2. The cylinders 02, 03, placed against each other, form the nip point 05 of a width of $b_N$. Roll-off of cylinders 02 and 03 during operation causes groove beats, which, in turn, excite vibrations of the cylinders 02, 03, as seen in FIG. 2.

Preferred embodiments of the seating of a cylinder 02, 03 by the use of bearing arrangements, such as seen at 06, and at 42, are disclosed which, in an advantageous manner, permit the countering of these vibrations. A force is purposefully exerted, in the area of the bearing and/or journal, by the use of one or of several actuators. The bearing arrangements 06, 42, can be provided as bearing units 06, 42, containing rotary bearings, as well as including the actuator or actuators.

Figure 3:
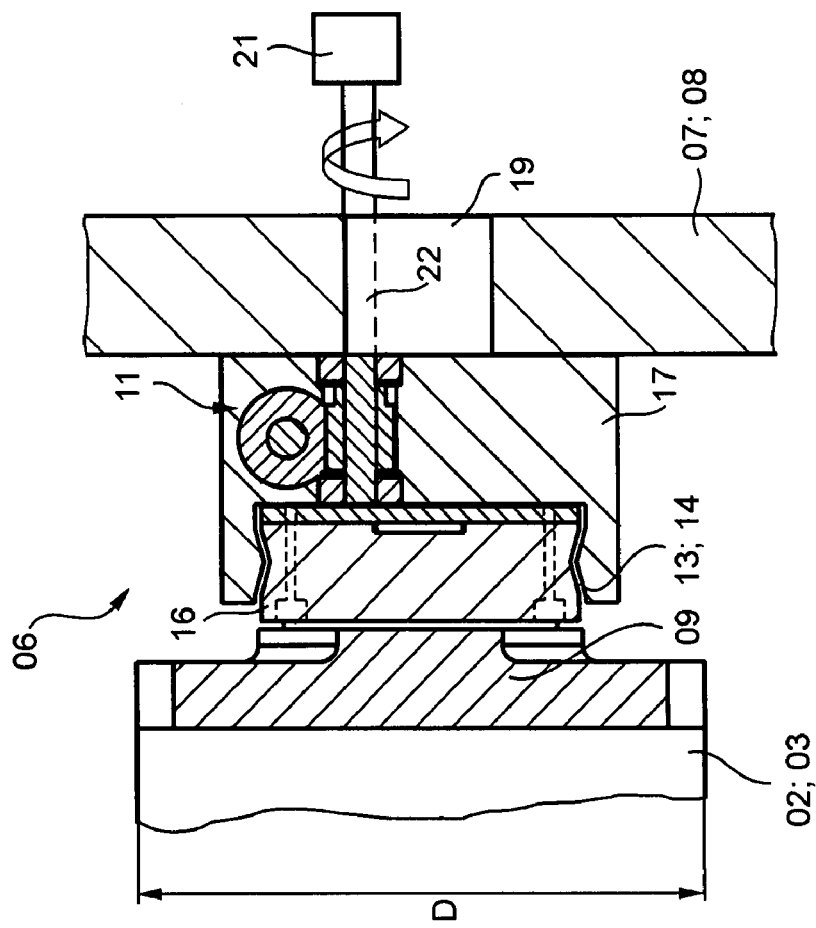
FIG. 3, a side elevation view, partly in section, through a first preferred embodiment of a bearing unit in accordance with the present invention, in FIG. 4, a schematic cross-section through a bearing unit with actuators, in FIG. 5, a cross section through the bearing unit depicted in FIG. 3, in FIG. 6, a second preferred embodiment of a bearing with linear displacement, in FIG. 7, the bearing of FIG. 6 depicted in a different sectional view, in FIG. 8, an arrangement of several bearings of a printing group, in FIG. 9, a third preferred embodiment of a bearing in accordance with the present invention, in FIG. 10, a schematic representation of the third preferred embodiment in accordance with FIG. 9, in FIG. 11, an embodiment of the present invention with double front-side bearing, and in FIG. 12, a schematic representation of the control with adaptive regulation.

In a first preferred embodiment of the present inventions, modules, which are configured as cylinder units 04, have, for example, a cylinder 03 with a journal 09 and with a bearing unit 06, which can be, or which already is preassembled, prestressed and/or preset on the journal 09, as seen in FIG. 3. The bearing unit 06 and the cylinders 02, 03 are provided, for example, prior to their insertion into the printing unit, with their positions fixedly defined in relation to each other, and can be inserted into the printing unit as a unit. However, the bearing unit 06 can also be embodied in the customary manner, but can also contain an actuator for use in counteracting vibrations.

It is provided, in an advantageous embodiment of the present invention, to rotatably seat the cylinders 02, 03 in lateral frames 07, 08 in bearing units 06, which do not penetrate, or extend beyond, the alignment of the lateral frames 07, 08, and/or to insure that the cylinders 02, 03, with their barrels, and including their journals 09, are of a length L02, L03, which is less than or is equal to a clear width LW between the lateral frames 07, 08 supporting the printing group cylinders 02, 03 at both front faces, all as seen in FIG. 1. The lateral frames 07, 08 supporting the printing group cylinders 02, 03, at both of the cylinders end faces, preferably are not lateral frames that open at the sides in such a way that the cylinders 02, 03 could be axially removed, but instead are lateral frames 07, 08 with at least a partial coverage in the axial direction of the end of the mounted cylinders 02, 03. This means that the end face or side of the cylinder 02, 03, and in particular its seating, as depicted below, is at least partially framed at the ends by the two lateral frames 07, 08. In principle, it is also possible to provide a releasable seating in the lateral frame 07, 08 which supports the bearing units 06, 42, as is seen in FIG. 1.

Preferably all four of the printing group cylinders 02, 03, but at least three of the cylinders, have their own bearing unit 06 for each end face, into which unit 06 the on/off switching mechanism, or at least a gear 11, that is usable for performing the relative movement between the bearing element fixed in place on the frame and the movable one, has already been integrated. It is also possible to provide bearing units without an on/off switching mechanism for two of three, or for three of four of the cylinders 02, 03 having the on/off switching mechanism.

Figure 4:
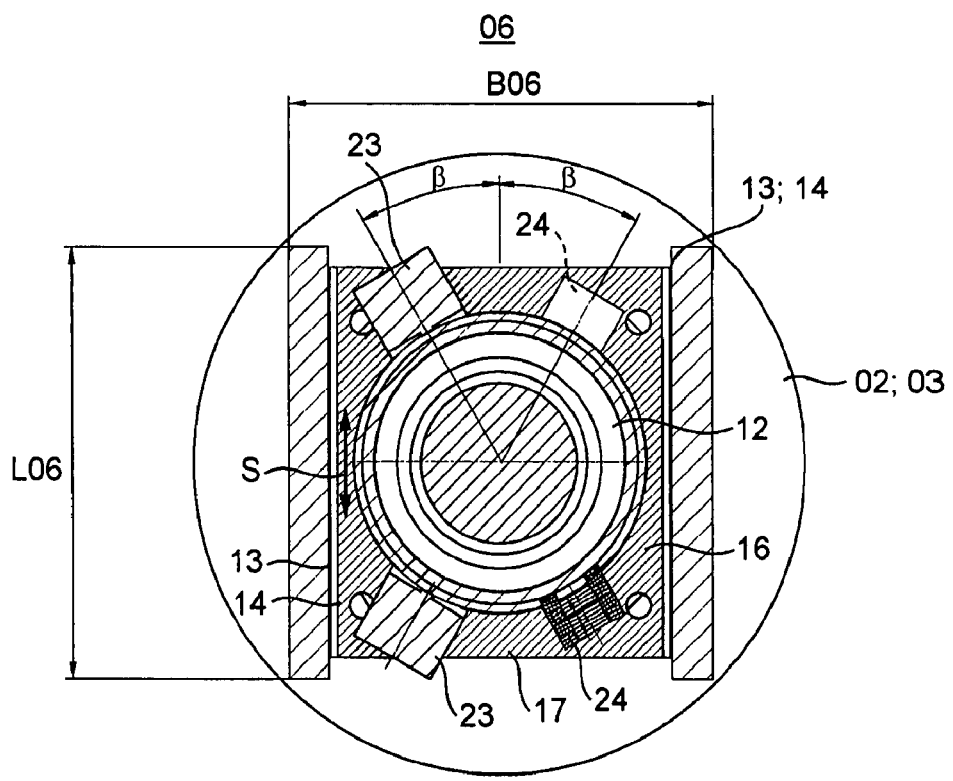
Figure 6:
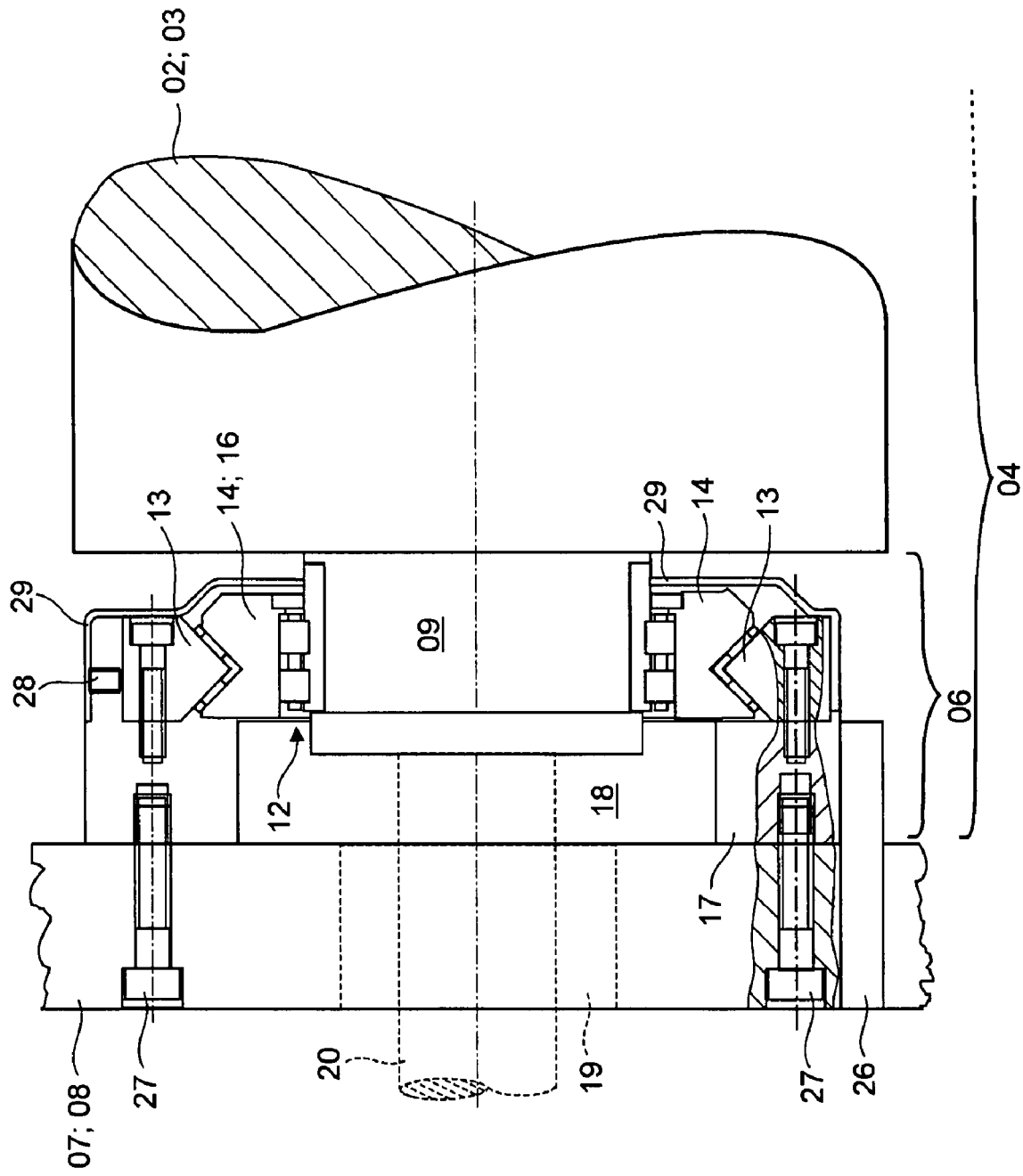

FIGS. 3 and 4 show a bearing unit 06, preferably based on linear actuating paths, in side view and in cross-section. The bearing unit 06, which integrates the on/off switching mechanism, or at least the gear 11, has, besides a radial bearing 12, such as, for example, a cylinder rolling bearing 12, for the rotatory seating of the cylinder 02, 03, also includes bearing arrangements 13, 14 for a radial, and in particular for a linear movement of the cylinder 02, 03, for print-on, or print-off positioning. For this purpose, the bearing unit 06 has bearing elements 13 fixed on a support 17, which support 17 is fixed to the frame after mounting of the cylinder unit 04, as well as bearing elements 14, which can be moved against the bearing elements 13. The bearing elements 13 fixed on the support 17, and the movable ones 14 are preferably configured as linear elements 13, 14 acting together and, together with appropriate sliding surfaces or with interspersed rolling elements, are configured, as a whole, as a linear bearing 13, 14. In pairs, the linear elements 13, 14 receive between themselves a bearing block 16, such as, for example, a carriage 16, receiving the radial bearing 12. The bearing block 16 and the movable bearing elements 14 can also be of one-piece construction. The stationary bearing elements 13 are arranged on a support 17 which, as a whole, will be, or is connected with the respective lateral frame 07, 08. The support 17 can be embodied as a base plate or as a border, such as, for example, in the form of a circle, a rectangular or other basic shape which has, for example on at least one press drive side, a cutout 18, as may be seen in FIG. 6 for the passage of a driveshaft for a journal 09 of a cylinder 02, 03. On the press drive side, the lateral frame 07, 08 also preferably has a recess 19, and in particular, has a recess 19 configured in the form of an elongated hole, or as an opening 19, for a driveshaft 20, which is to be connected, fixed against relative rotation, with the journal 09, as shown in FIG. 6. Neither a cutout 18 nor a recess 19 need be provided on the cylinder end that is located opposite the press drive side.

The configuration of the linear bearings 13, 14 in the way that the cooperating bearing elements 13, 14 are both provided on the component bearing unit 06, and are not as a part situated on the lateral frame 07, 08 of the printing unit, makes possible the pre-assembly and preadjustment, or setting, of the bearing tension. The advantageous arrangement of the two linear bearings 13, 14 enclosing the bearing block 16 makes possible an actuation, free of play, since the two linear bearings 13, 14 are located opposite each other in such a way that the bearing pretension and the bearing forces undergo, or absorb, a substantial component in a direction extending perpendicularly with respect to the axis of rotation of the cylinder 02, 03. The two linear bearings 13, 14, each with bearing elements 13 and 14 are embodied parallel with respect to their actuating direction S, which is shown in FIG. 4, wherein they are located spaced apart from each other, as viewed with respect to a plane that is perpendicular to the axis of rotation of the cylinder 02, 03, and preferably receive the bearing block 16 between them. Thus, the linear bearings 13, 14 can be adjusted in that direction, which also is important in connection with the actuation, free of play, of the cylinders 02, 03. The bearing elements 13, which are fixed in place on the frame 07, 08, are arranged substantially parallel with respect to each other and define an actuating direction S.

Since the cylinder 02, 03, including the journal 09 and the bearing unit 06, does not penetrate the lateral frame 07, 08, these can be placed into the printing unit, already preassembled, and the bearings, such as the radial bearings 12, as well as linear bearings 13, 14, which are preset, or correctly prestressed, can also be placed in the printing unit in the form of a cylinder unit module 06. In the wider sense, the "non-penetration" and the above definition, with regard to the clear width LW shown in FIG. 1, is to be advantageously understood to mean that, at least in the area of the intended end position of the cylinders 02, 03, and at least on a continuous path from a lateral frame edge to the location of the end position, such a "non-penetration" exists, so that the cylinder unit 04 can be brought to its end position, from an open side that is located between the fronts of the two lateral frames 07, 08 without tilting, i.e. in a position with the axis of rotation perpendicular in relation to the plane of the lateral frame, and can be arranged there between the inner walls of the two lateral frames, and in particular can be fastened on the inner walls of the lateral frames. This is also possible, for example, in case raised parts or castings are present on the inside of inner wall, but the above-described continuous assembly path is provided.

Assembly aids, which are not specifically represented, such as, for example setting pins, can be provided in the lateral frame 07, 08 for accomplishing correct placement, at which assembly aids the bearing unit 06 of the completely assembled cylinder unit 04 is aligned, before it is connected with the lateral frame 07, 08 by suitable releasable holding means, such as, for example, by suitable screws, or even in a material-to-material contact by welding. Appropriate, non-represented elements, such as, for example, tightening screws, can be provided for setting the bearing prestress in the linear bearings 13, 14, which setting of bearing prestress is typically already performed prior to the insertion of the linear bearings in the printing unit and/or is to be readjusted following the insertion. The bearing unit 06 is preferably protected, to a large extent, against soiling, at least in the direction toward the cylinder side, by the use of a cover, which is not specifically represented, or may even be encapsulated as a modular unit.

For modular construction, the bearing elements 06 for the forme cylinders 03 and for the transfer cylinders 02 are preferably embodied as being structurally identical, except for the permitted operational size of the actuating path, if needed. Because of the possibility of a preassembled embodiment, the effective interior surface of the radial bearing 12 and the effective exterior shell face of the journal 09 can be embodied to be cylindrical instead of conical, since both the assembly of the bearing unit 06 on the journal 09, as well as the setting of the play of the bearing, can take place while the cylinders are still outside of the printing unit. A cylindrical shaft seat is preferably provided between the journal 09 and the radial bearing 12. For example, the bearing unit 06 or the radial bearing 12 can be shrunk on, and the assembly of the preassembled cylinder unit 04, complete with the bearing, in the lateral frame 07, 08 can take place. The bearing prestress is achieved by the adjustment between shaft seating and the interior ring of the rolling bearing, and need not be set during the mounting of the cylinder 02, 03 in the printing unit, which results in time savings during assembly.

The bearing unit 06 has the linearly movable carriage or guide carriage 16 as the movable element, which carriage 16 receives the radial bearing 12, and possibly has an axial bearing, such as, for example, for adjusting the lateral register of the cylinder 03, and has a degree of freedom perpendicular to the cylinder axis. The stationary portion, including the support 17 with bearing elements 13, of the bearing unit 06 is fastened, such as, for example, by being screwed to, the lateral frame interior of the lateral frame 07, 08.

A gear 11, and in particular one which is free of play, or one which is prestressed, is integrated into this stationary part or support 17 of the bearing unit 06, which gear 11 converts an actuating movement, that was introduced from outside of the bearing unit 06 to a member of the gear 11, into a linear movement of the carriage 16. Preferably, as indicated in FIG. 3, a gear 11, which is embodied in this way, is integrated and converts, for example via a shaft 22, the rotary movement of an actuating drive 21, or an actuating assembly 21, which is only schematically indicated in FIG. 3, into a linear movement of the carriage 16 perpendicularly, with respect to the shaft 22, or to the axis of the actuating drive 21 and/or perpendicularly to the cylinder axis. This gear 11 can, for example, contain a rotating gear wheel, that is driven by the shaft 22, and which works together with a toothed rack that is assigned to the movable part. However, it can also be configured in any other way. The actuating drive 21 is preferably embodied as a rotatory drive mechanism either manual, or preferably as an electric motor, and in particular an electric motor which is capable of being remote-controlled. It is preferably arranged on, such as, for example by being flanged to, the rear of the bearing unit 06, and in particular on the side of the lateral frame 07, 08 or the so-called screwing face for the lateral frame which is the frame face that is facing away from the bearing unit 06. Preferably, the axis of rotation of the actuating drive 21 extends substantially parallel to, but is offset from, the cylinder axis.

Figure 5:
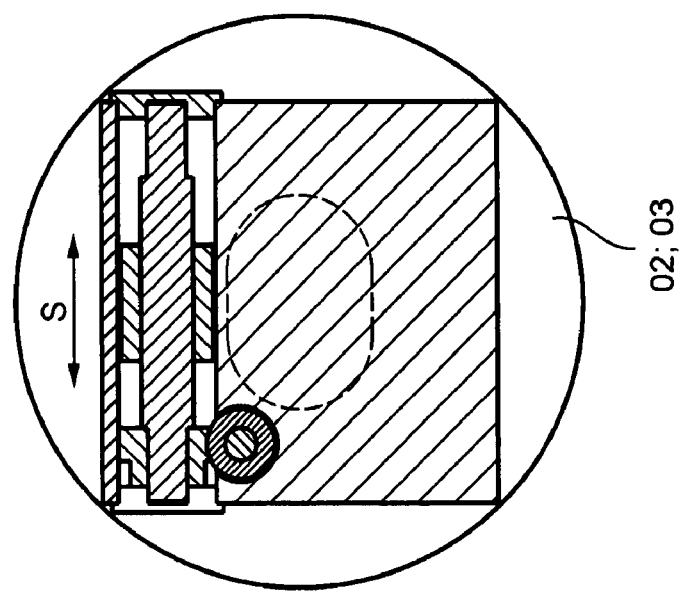

Alternatively, the following variation is more advantageous than the above-mentioned toothed rack solution. In this variation, a rotatory actuating drive 21, ideally in the form of a step motor 21 is provided for synchronization between the two front lateral frames 07, 08. Such a drive can be an adaptive drive, ideally provided as an attached planetary gear upstream of the actuating drive 21, as an angular drive, such as a self-locking worm gear as represented in FIGS. 3 and 5, since the axes, the drive motor and the linear actuating path are orthogonal, or can be a rotatory-linear change gear, which is prestressed and is therefore ball screw drive, free-of-play, as represented in FIGS. 3 and 5.

In cross section, the structural space of the bearing unit 06 should preferably be less than, or at most equal to, the cross-sectional endface of the cylinder 02, 03 and thus has, at the most, a bearing ring diameter.

An edge measurement or length L06 of the bearing unit 06× a width B06 of the bearing unit 06, cross section to front face of the cylinder is less than a diameter D of the cylinder or the bearing ring, preferably corner measurement e<D.

L06 or B06<300 mm, preferably e<300 mm, in an advantageous embodiment L06, B06<200 mm, in a particularly advantageous embodiment L06 and B06 each less than 150 mm.

A force measurement, and in particular a measurement of the radial force in the actuating direction, is advantageously integrated into the frame of the bearing, or of the drive mechanism. For example, the electric current consumption of the actuating means 21, such as, for example, the motor 21, or a moment in the gear, such as, for example, the torsional moment of the spindle, etc., is determined and is evaluated.

In a printing unit with at least three cylinders 02, 03 acting together, such as, for example, with counterpressure cylinders, as a printing unit 01, at least two of the three cylinders 02, 03 are each movably seated in such linear bearings 13, 14 for movement along an actuating direction S which maximally encloses an angle of 15°, together with a connecting plane, that is constituted by the axes of rotation of the cylinder 02, 03 to be actuated and by the one following in the actuating direction. In that case, the movable cylinder 02, 03 is respectively seated only in the above-described bearing units 06 which are assigned to this cylinder 02, 03.

As previously mentioned, the movable cylinders 02, 03 preferably are preassembled, or can be preassembled, as cylinder units 04 together with respective end face bearing units 06. For this purpose, these cylinders 02, 03, in the form of modules each with barrels and with two end journals 09, have the above mentioned maximal length L02, L03.

In a printing group 01 that is configured as a double printing group 01, preferably at least the two forme cylinders 03 and at least one of the two transfer cylinders 02 are seated linearly movable in this way. The second transfer cylinder 02 can be seated operationally fixed in the frame, but be adjustable in its position. However, in a variation, all four of the cylinders 02, 03 can be seated linearly movable in this way.

In a three-cylinder printing group 01 for use in one-sided imprinting, at least two, and in particular at least the two ink-conducting cylinders 02, 03, such as, for example, the forme cylinder 03 and the transfer cylinder 02 but in a variation all three cylinders 02, 03, are seated linearly movable in this way.

To accomplish the above-mentioned active vibration damping in the area of the bearing, as indicated in FIG. 4, the bearing 06 has at least one actuator 23, such as, for example, a piezo actuator 23, by the use of which actuator 23, the introduction of a force into the bearing support point is made possible. The integration of the actuators 23 into the above mentioned bearing unit 06 is advantageous. To detect vibrations, two force transducers are provided, which force transducers are spaced apart from each other in the circumferential direction at an angle not equal to zero, and preferably at 90° or 120°. If only one actuator 23 is provided for each bearing unit 06, it is possible to provide only one sensor. Piezo-electrical sensors constitute a possible sensor embodiment which, in an advantageous version, are simultaneously usable as the actuators 23.

In a general embodiment of the printing group 01, two actuators 23 and at least one spring element 24, which is here embodied as a plate spring package, are required in order to make possible resulting force directions in every direction of the plane of the drawing sheet containing FIG. 4. Preferably, the spring element 24 is arranged substantially opposite the actuators 23. For reasons of structural space, two spring elements 24 are provided in the embodiment depicted in FIG. 4 as abutments for the actuators 23, for use in providing a restoring force. Viewed in the effective direction; i.e. the radial direction toward the journal 09, for example, the actuators 23 have a length of, for example, at least 10 mm, advantageously at least 15 mm, and in particular at least 20 mm. So that a sufficiently large moment/force can be applied, the actuator 23 has, for example, a cross-sectional surface, perpendicularly, with respect to the effective direction, of at least 50 mm$^2$, and in particular of at least 60 mm$^2$. The piezo-actuator 23 preferably has a rigidity of, for example, at least 400,000 N/mm, preferably at least 500,000 N/mm, and for example approximately 600,000 N/mm. The spring element 24 has, for example, a rigidity of at least 2,500 N/mm, and in particular of at least 3,000 N/mm. The two actuators 23 are, for example, inclined at an angle β, for example greater than 20°, and in particular between 20° and 45°, for example approximately 30°, with respect to the straight line defined by the actuating direction S.

Figure 8:
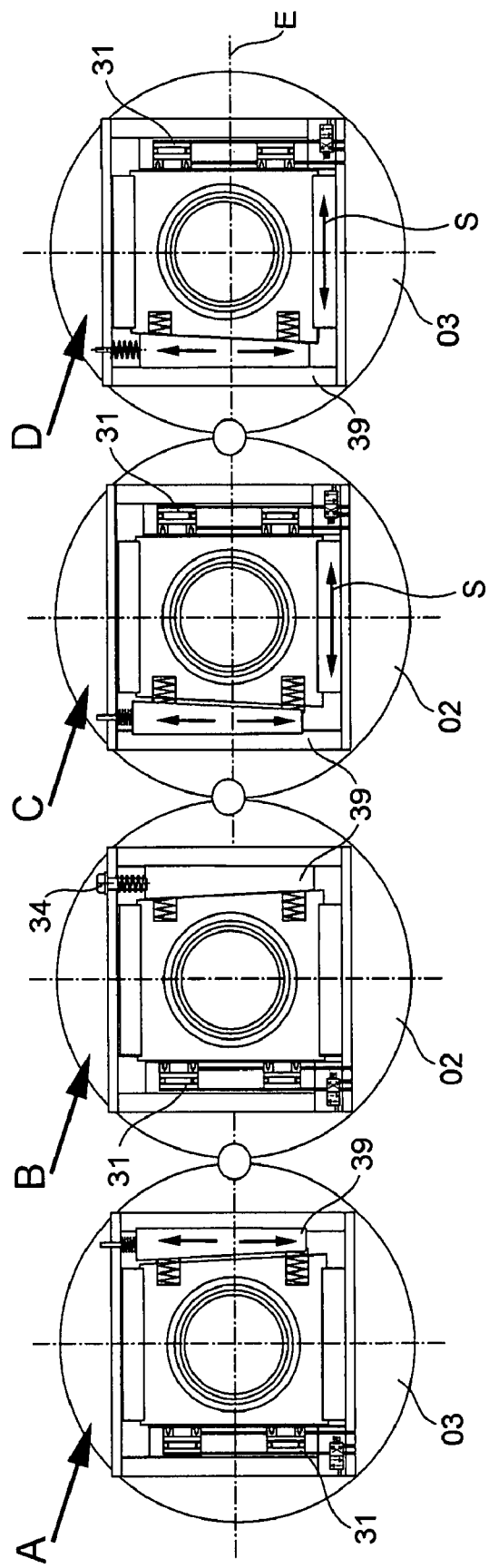

In an advantageous embodiment of the printing group 01, in which the axes of rotation of the printing group cylinders 02, 03 are located in a common plane E as seen in FIG. 8, only one actuator 23 is basically sufficient in the bearing unit 06. However, it must be configured to have an appropriately strong output. In this case, the actuating direction of this single actuator 23 preferably extends in this common plane E and also extends perpendicularly with regard to the axis of rotation.

Figure 12:
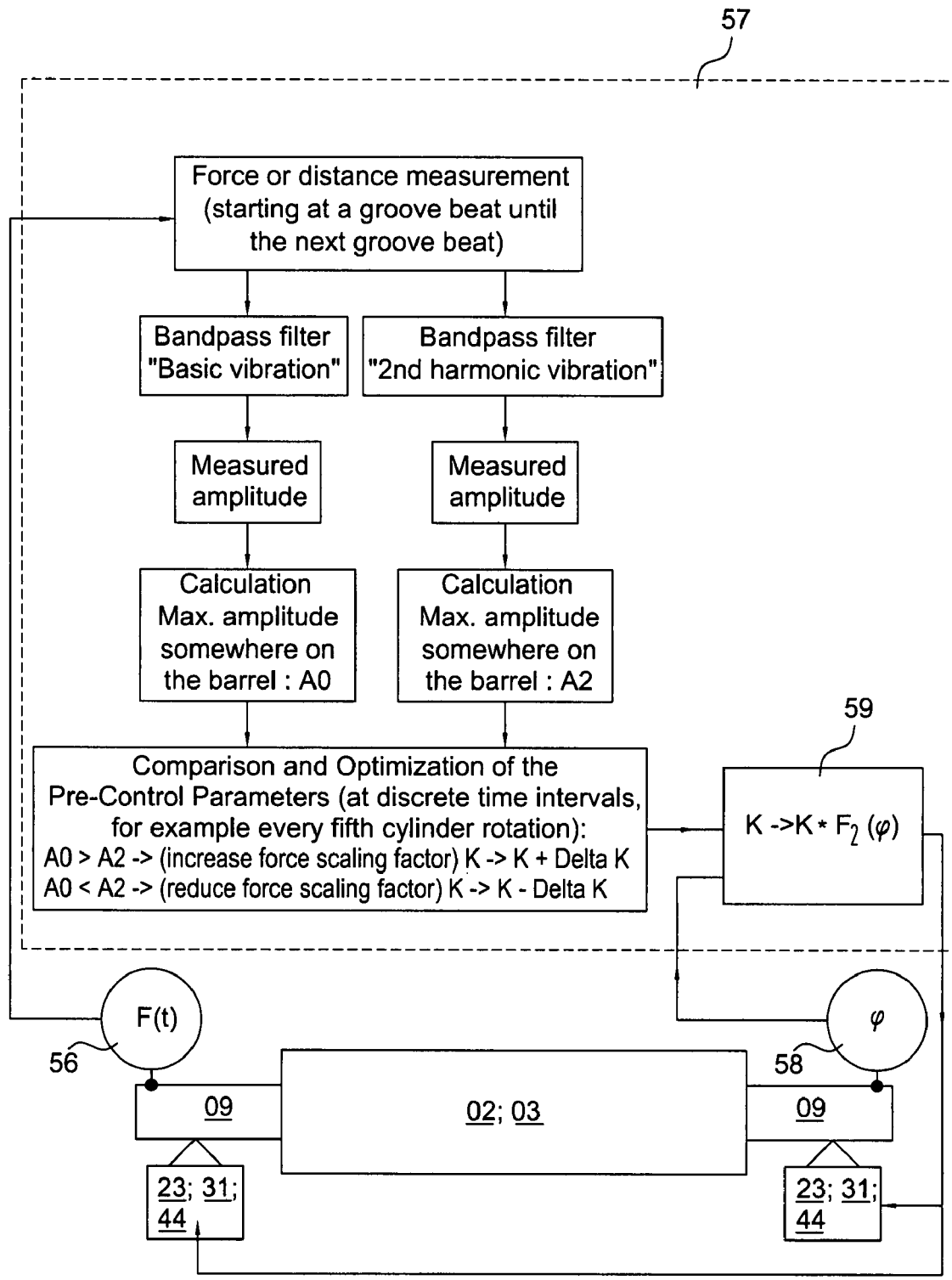

Thus, different actuators 21, 23 are provided in the first embodiment, on the one hand for the contact/out of contact movement, an actuator 21 which is embodied as an actuating drive 21, and on the other hand an actuator 23 for vibration compensation The actuators 23 are in signal connection with a regulating and/or control arrangement 57, such as, for example, an adaptive control device 57, which is schematically represented in dashed lines in FIG. 12.

Figure 7:
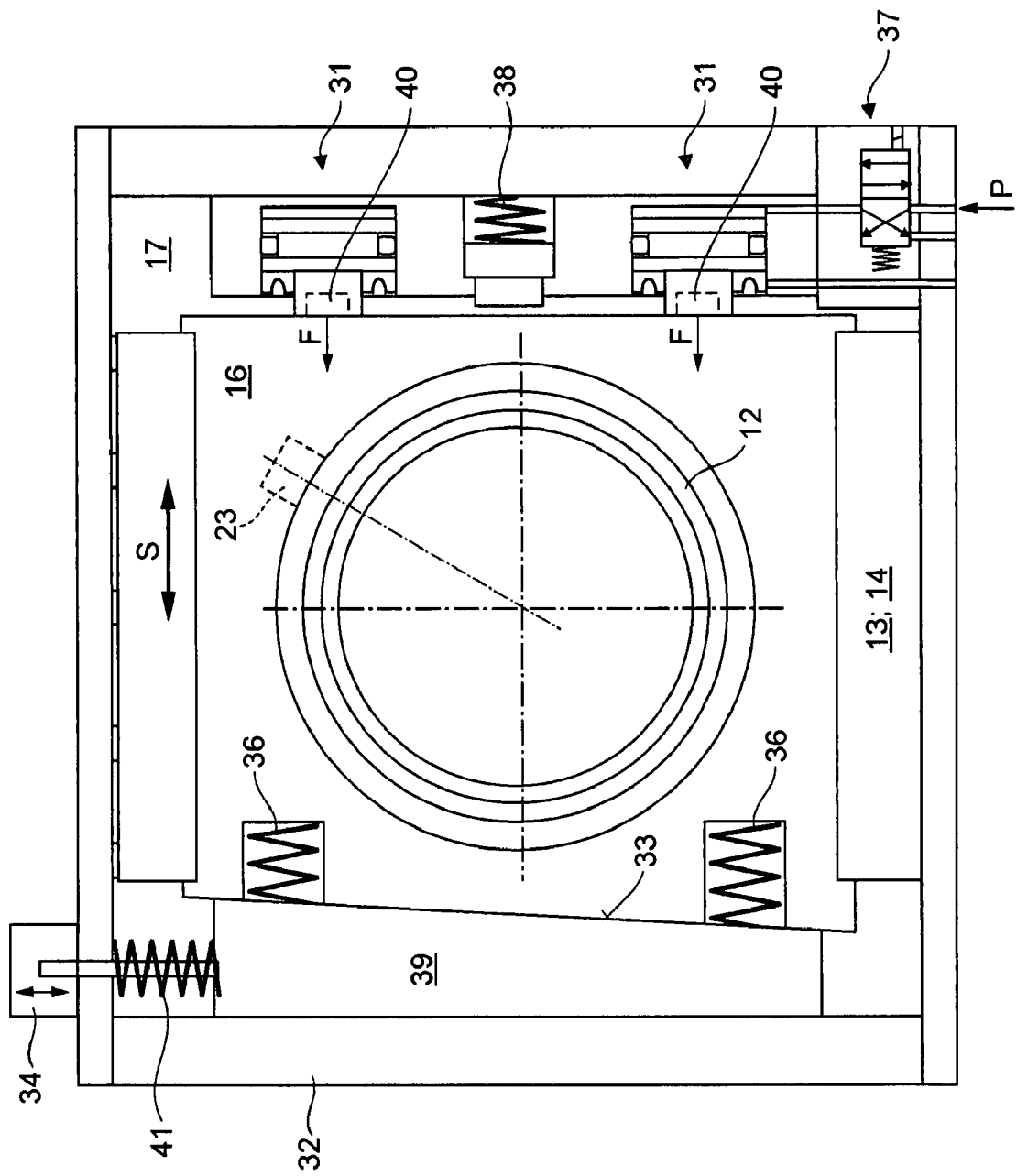

FIGS. 6 and 7 show a second preferred embodiment of an advantageous bearing unit 06, based on linear actuating paths, and shown in longitudinal and cross section, respectively. The bearing unit 06 into which the cylinder contact/out of contact mechanism is integrated has, besides a radial bearing 12, for example a cylinder roller bearing 12 for the rotatory seating of the cylinder 02, 03, and seating bearing elements 13, 14 for a radial movement of the cylinder 02, 03, for print-on, or print-off, setting. For this purpose, the bearing unit 06, which is fixed on the frame after assembly of the bearing unit 06, has bearing elements 13 which are fixed on the support, as well as bearing elements 14 which can be moved with respect to the elements 13. The bearing elements 13, which are fixed on the support, and the movable bearing elements 14 are embodied as cooperating linear elements 13, 14 and, together with corresponding sliding surfaces or with interspersed rolling elements, as linear bearings 13, 14 as a whole. In pairs, the linear elements 13, 14 receive between them a bearing block 16, such as, for example, a carriage 16, which receives the radial bearing 12. The bearing block or carriage 16 and the movable linear bearing elements 14 can also be embodied in one piece. The fixed linear bearing elements 13, fixed on the support, are arranged on a support 17, which, as a whole, will be, or is, connected with the lateral frame 07, 08. For example, the support 17 is embodied as a support plate 17, which has a cutout 18, located, for example, at least on a drive side, for the passage of a driveshaft 20, shown in dashed lines in FIG. 6, of a journal, which is not specifically represented in FIG. 7, of the cylinders 02, 03. The lateral frame 07, 08 on the drive side preferably has a recess 19, or an opening 19, for a driveshaft 20. No cutout 18 nor recess 19 need to be provided on the cylinder end that is located opposite the drive side, as seen in FIG. 6.

The embodiment of the linear bearings 13, 14 in such a way that the cooperating bearing elements 13, 14 are both provided on the bearing unit module 06, and not as a part on the lateral frame 07, 08 of the printing unit 01, makes possible a preassembly and a preadjustment, or setting, of the bearing tension. The advantageous arrangement of the two linear bearings 13, 14, as enclosing the bearing block 16, makes an actuation free of play possible, because the two linear bearings 13, 14 are located opposite each other in such a way that the bearing pretension and the bearing forces experience, or absorb, a substantial component in a direction that is perpendicular to the axis of rotation of the cylinder 02, 03. Therefore, the bearings can be adjusted in that direction which is important in the course of the actuation, free of play, of the cylinder 02, 03.

Because the cylinder 02, 03, including the journal 09 and bearing unit 06, does not penetrate or extend into the lateral frame 07, 08, because they have already been preassembled, and because the bearings; i.e. the radial bearing 12, as well as the linear bearings 13, 14, have been preset, or correctly prestressed, they can be inserted into the printing unit as a cylinder unit 04 module. "Non-penetration" and the above definition, with regard to the clear width, is to be advantageously understood, in the wider sense that, at least in the area of the intended end position of the cylinders 02, 03, and at least on a continuous path from a lateral frame edge to the location of the end position, such "non-penetration" exists. Accordingly, the cylinder unit 04 can be brought to its end position from an open side that is located between the fronts of the two lateral frames 07, 08, without tilting, or in a position with the axis of rotation perpendicular with relation to the plane of the lateral frame, and can be arranged there between the inner walls of the two lateral frames, and in particular can be fastened on the inner walls of the lateral frames. This is also possible, for example, in case castings or other raised parts are present on the inside, but the continuous assembly path is still provided.

The bearing units 06 are arranged on the inner walls of the lateral frames 07, 08 in such a way that the cylinders 02, 03, and in particular their bearing units 06, on the side facing the cylinder 02, 03 are supported by the lateral frames 07, 08, which entails static and assembly advantages.

Assembly aids 26, such as, for example, setting pins 26, can be provided in the lateral frame 07, 08 for facilitating correct placement, at which aids 26, the bearing unit 06 of the completely assembled cylinder unit 04 is aligned before it is connected with the lateral frame 07, 08 by releasable holding members 27, such as, for example, screws 27, or even in a material-to-material contact by welding. Appropriate, elements 28, such as, for example, tightening screws 28, can be provided for setting the bearing prestress in the linear bearings 13, 14, which prestress setting is to be performed prior to the insertion in the printing unit and/or is to be readjusted following the insertion, as seen in FIG. 6. The bearing unit 06 is preferably protected to a large extent against soiling, at least in the direction facing toward the cylinder side, by a cover 29, or is even encapsulated as a modular unit.

The cylinder 02, 03 with the journal 09 and a preassembled bearing unit 06 is represented in FIG. 6. This module can be inserted, already preassembled, between the lateral frames 07, 08 of the printing unit in an assembly-friendly manner, and can be fastened on locations provided for this insertion and securement. For a modular construction, the bearing units 06 for the forme cylinder 03 and for the transfer cylinder 02 are embodied identically structured, except for the permitted operational size of the actuating path, if needed. Because of the preassembled embodiment, the effective interior surface of the radial bearing 12 and the exterior effective shell face of the journal 09 can be embodied to be cylindrical instead of conical, since both the assembly of the bearing unit 06 on the journal 09, as well as the setting of the play of the bearing, can take place outside of the printing unit. The bearing unit 06 can be shrunk on the journal 09, for example.

The bearing elements 13, which are fixed on the frame, are arranged substantially parallel with respect to each other. They define an actuating direction S, as may be seen in FIG. 7.

Print-on positioning takes place by moving the bearing block or carriage 16 in the direction of the print position by the application of a force F which is exerted on the bearing block 16 by at least one actuator 31, and in particular by a force-controlled actuator 31 or by one defined by a force, by the use of which, a defined, or definable, force F can be exerted on the bearing block 16 for contact in the print-on direction, as seen in FIG. 7. The linear force in the nip points 05, which is decisive for, inter alia, ink transfer and therefore for the print quality, is thus defined not by an actuating path, but by the equilibrium of forces between the force F and the linear force $F_L$ resulting between the cylinders 02, 03, and the resultant equilibrium. In a first embodiment, which is not specifically represented by itself, cylinders 02, 03 are placed against each other in pairs. The bearing block or carriage 16 is charged with the appropriately adjusted force F via the actuator or actuators 31. If several, such as, for example, three or four cylinders 02, 03, which adjoin each other in direct sequence and which cooperate respectively in pairs, are configured with a purely force-dependent actuating mechanism, and without any possibility for fixing or limiting the actuating path, it is possible to bring a system, which has already been adjusted with respect to the required pressures or linear forces, out of contact and thereafter to correctly bring it back into contact again, but it is possible, only with difficulty, to perform a basic actuation because of the reactions which, in part, interfere with each other.

For the basic actuation of a system, provided with appropriate dressings, etc., it has therefore been provided, in an advantageous embodiment, that at least the two center ones of the four cylinders 02, or expressed differently, at least all of the cylinders 02 which are different from the two outer cylinders 03, can be fixed in place, or their path is at least limited, in the contact position found by the equilibrium of force.

An embodiment is particularly advantageous wherein the bearing block 16 is movably seated, also during operation, at least in a direction away from the print position against a force, such as, for example, against spring force, and in particular against a definable force. In contrast to purely a path limitation, in the course of the cooperation of the cylinders 02, 03 a maximal linear force is defined on the one hand by this, and on the other hand yielding is made possible, such as, for example, in the case of a web tear, with the subsequent wrapping of the web around the cylinder 02, 03.

The bearing unit 06 has a detent 39, whose position can be changed, at least during the actuating process, towards a side which is facing the print position, and which limits the actuating path along the actuating direction S in the direction toward the print position. The position of the detent 39 can be changed in such a way that a detent contact face 33, which itself acts as the detent, can be varied along the actuating direction S in at least one area. Thus, in an advantageous embodiment an adjusting device, such as an adjustable detent, is provided, by the use of which, the location of an end position of the bearing block 16 near the print position can be adjusted. A key drive, as will be described below, is, for example, used for limiting or adjusting the path. The actuation of the detent can, in principle, take place manually or by the use of an actuating assembly 34 which is configured as an actuator 34, as discussed below. Furthermore, in an advantageous embodiment, holding or clamping assemblies, which are not specifically represented in FIGS. 6 and 7, are provided, by the use of which, the detent 39 can be fixed in place in the desired position. Furthermore, at least one resiliently acting element 36, such as, for example, a spring element 36, is provided, which applies a force $F_R$ on the bearing block 16 away from the detent 39 in a direction away from the print-on position. This means that the spring element 36 causes a print-off positioning for the case in which the bearing block 16 is not prevented, in some other way, from movement. Print-on positioning takes place by moving the bearing block 16 in the direction of the detent 39 by the use of at least one actuator 31, and in particular by the use of a force-controlled actuator 31, by the use of which, a defined, or a definable, force F, in the print-on direction, can be selectively applied to the bearing block 16 for bringing it into contact. If this force F is greater than the restoring force $F_R$ of the spring elements 36, the placement of a cylinder 02, 03 against the adjoining cylinder 02, 03, provided these cylinders 02, 03 are appropriately spatially embodied, and/or the placement of the bearing block 16 against the detent 39, takes place.

In the ideal case, the applied force F, the restoring force $F_R$ and the position of the detent 39 are selected in such a way that, in the connected position, no substantial force ΔF is transmitted between the detent 39 and the detent face 33 of the bearing block 16, so that, for example, $|\Delta F|<0.1*(F-F_R)$, in particular $|\Delta F|<0.005*(F-F_R)$ ideally $|\Delta F|\approx 0$. In this case, the contact force is substantially determined by the force F applied to the actuator 31. Therefore, the linear force in the nip points 05, which force is decisive for, inter alia, ink transfer and therefore for the print quality, is thus not primarily defined by an actuating path but, with a quasi-free detent 39, by the force F and by the resulting equilibrium. In principle, following the determination of the base position, a removal of the detent 39, or of a corresponding fixation which is only effective during the basic actuation, would be conceivable by the use of forces F which are suitable for this.

The actuator 31 can basically be embodied as any arbitrary actuator 31 that is capable of providing a defined force F. The actuator 31 is preferably embodied as an actuating assembly 31 which can be operated by pressure media, and in particular as a piston 31 which can be moved by a fluid. In view of possible tilting, the provision of several, depicted here as two, such actuators 31 is advantageous. A liquid, such as, for example, oil or water, is preferably used as an actuating fluid because of its incompressibility.

A controllable valve 37 is provided in the bearing unit 06 for operating the actuators 31, which are embodied here as hydraulic pistons 31. This valve 37 is embodied, for example, so it can be electronically triggered and, in one operative position, relieves the hydraulic piston 31 of pressure, or places it at least on a lower level of pressure, while in the other operative position the pressure P, which causes the force F, is applied. In addition, a bleeder line, which is not specifically identified, is provided for safety.

In order to avoid too lengthy contact/out-of-contact paths, but to still provide protection against web wrap-arounds, it is possible to provide a path limit as an overload limiter on the side of the bearing block 16 which is remote from the print position by the provision of a detent 38, whose position can be changed and which limits the force, such as, for example, a spring element 38 which, during an operational print-off situation, i.e. one during which the pistons 31 are relieved and/or retracted, does function as a detent 38 for the bearing block 16 in the print-off position, but still yields in the case of a web wrap-around, or in the event of other oversized forces applied from the direction of the print position, and releases an increased path. Therefore, a spring force of this overload limiter 38 has been selected to be greater than the sum of the forces provided by the spring elements 36. It is therefore possible, during operational movement in or out of contact, to provide only a very short actuating path, such as, for example, only 1 to 3 mm.

In the represented embodiment shown in FIG. 7, the detent 39 is configured as a key 39, which is movable transversely with regard to the actuating direction S, wherein, in the course of movement of the detent 39, the position of the respectively effective detent face 33 varies along the actuating direction S. The key 39 is supported, for example, on a detent 32, which is fixed in place on a support.

The detent 39, which is here configured as a key, can be moved by the use of an actuator 34, such as, for example, by an actuating assembly 34, which can be operated by pressure, such as a piston 34 which can be operated via a threaded spindle by pressure in a work cylinder with a double-acting piston or an electric motor. This actuator 34 can either work in both directions or, as represented in FIG. 7, can be configured as a one-way actuator which, when activated, works against a retaining spring 41. For the above mentioned reasons, detent 39 being force-free to a large extent the force of the retaining spring 41 has been selected to be so weak that the key is maintained in its correct position merely against the force of gravity or vibrational forces.

The detent 39 can, in principle, also be embodied in other ways, such as, for example, as a piston which can be actuated and which is fixed in place with regard to the actuating direction S, etc., so that it constitutes a detent face 33, which can be fixed in place and which can be varied in the actuating direction S, at least during the adjusting process, for the movement of the bearing block 16 in the direction toward the print position. In an embodiment which is not specifically represented, actuating of the detent 39 takes place, for example directly parallel, with respect to the actuating direction S, by a drive assembly, such as, for example, a cylinder with a double-acting piston, which can be operated by pressure, or by an electric motor.

The printing group 01 depicted in FIG. 8, and which is embodied as a double printing group 01, schematically shows one bearing unit 06 per cylinder 02, 03. In an advantageous embodiment, as represented in FIG. 8, in a print-on position, the centers of rotation of the cylinders 02, 03 form an imaginary connecting line, or connecting plane E and are thus called a "linear double printing group" in what follows. The plane E, and an entering or exiting web preferably include an interior angle which differs from 90°, is between 19° and 38°, and in particular is from 80° to 41°. In the embodiment represented in FIG. 8, the bearing unit 06 of the transfer cylinder 02, and in particular of all of the several cylinders 02, 03, is arranged, in the mounted state, in such a way on the lateral frame 07, 08, that the bearing unit actuating directions S, for example, for reasons of a force-defined print-on position maximally include an angle of 15° with the connecting plane E, and for example, form an acute angle with each other of approximately 2° to 15°, and in particular 4 to 10° which is not specifically represented. This arrangement is of advantage, in particular in regard to mounting, if the actuating direction S extends horizontally and the web extends substantially vertically. In an embodiment which is represented in FIG. 8, the actuating direction S can also extend parallel, with regard to the plane E. In both variations, the direction of the introduction of force by groove or channel beats, and the resultant main level of vibration during nip passage corresponds, in substantial part, also to the actuating or to the force direction of the actuators 31. In this embodiment the countering of the action caused by these groove beats becomes possible by the use of the same actuators 31 as are used in connection with the placement of the cylinders into or out of contact.

Thus, in the second embodiment the same actuators 31 are provided for the into/out of contact movement, on the one hand, and for vibration compensation on the other hand.

In a modified embodiment of a double printing group 01 which is arranged angled, such as an- or u-printing group 01, it is intended to consider the plane E' to be the connecting plane of the cylinders 02 forming the print position, and the plane E" to be the connecting plane between forme and transfer cylinders 02, 03, and what was stated above in regard to the angle β is to be applied to the actuating direction S of at least one of the cylinders 02 forming the print position, or the forme cylinder 03 and the plane E', or respectively E".

One of the cylinders 02 which is forming the print position however, can also be arranged, fixed in place and operationally non-actuable, but adjustable, if required in the lateral frame 07, 08, while the other is seated along the actuating direction S.

In order to counteract the vibrations which are being created by groove beats, such as, for example, during nip passage, as shown in FIG. 2, it is now possible, either simultaneously or phase-shifted with respect to the groove beat/nip passage, to introduce a force pulse directly or indirectly into the journal 09, or into the bearing block 16 of the bearing unit 06.

Two ways of proceeding are possible in accordance with the present invention. In a first embodiment, the time for the introduction of the force pulse is determined from the known angular position of the cylinders 02, 03. This means that the actuator, such as the actuator 31, or an additional actuator 40 or 23, as will be discussed below, which is provided for damping vibrations, is charged with an appropriate signal or an actuating value as a function of the angle of rotation position of the respective cylinder 02, 03. In this case, control, with respect to the time, takes place, wherein the size of the signal, or of the force, can be preset as a function of the characteristic numbers of the machine, etc., or can be adaptively determined, if desired.

In a second embodiment of the present invention, the charging with the signal or the actuating value takes place as a function of measuring signals, i.e. in a real control circuit. This measuring signal can consist, for example, of a measurement of the path or acceleration at the bearing unit 06, in particular at the bearing block 16 or the journal 09, or as a pressure measurement in the hydraulic system for pressure medium supply of the actuators 31.

Figure 10:
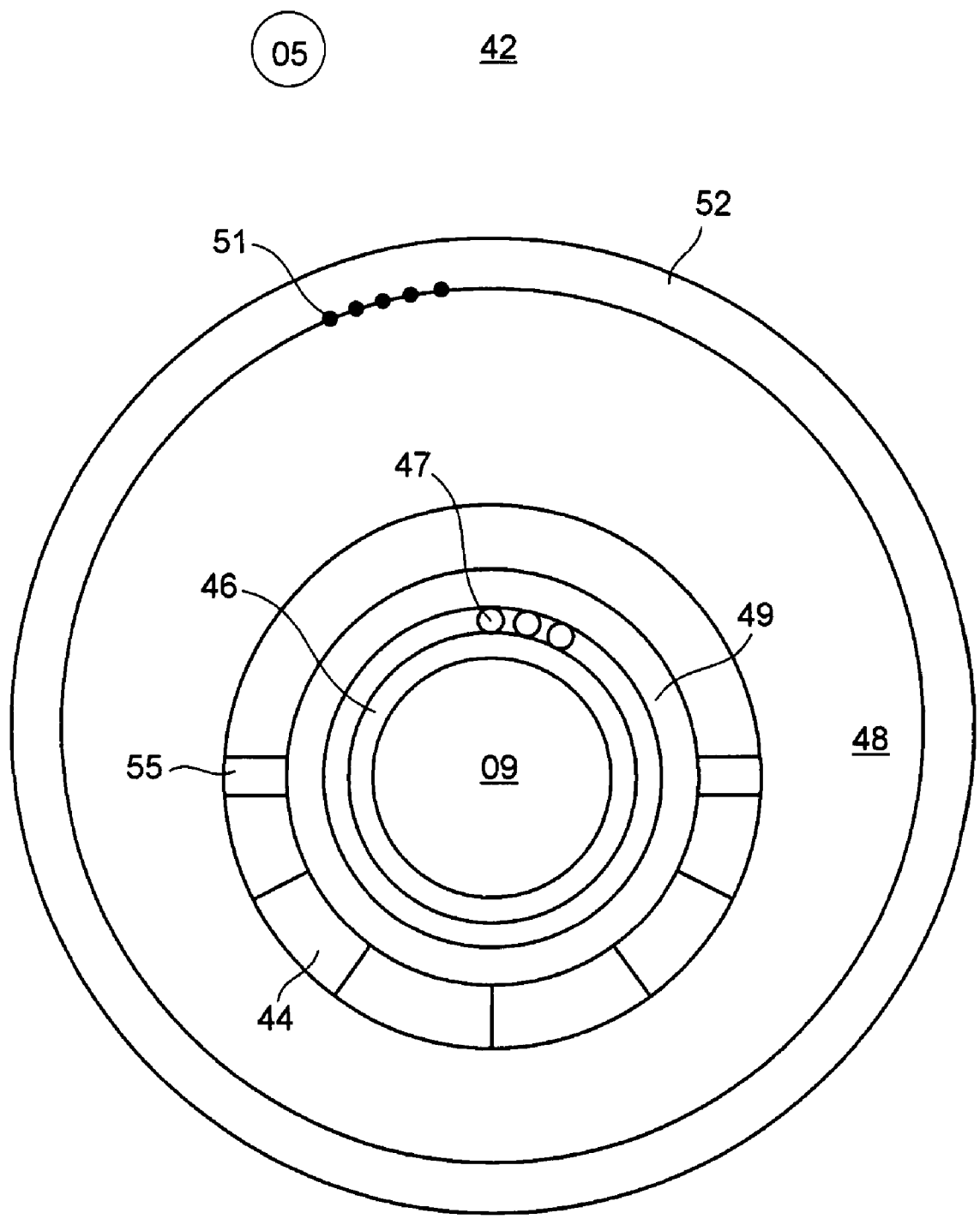

Two embodiments are possible for use in generating the force pulse that is usable for counteracting the vibration. In a first embodiment, the generation of these force pulses is provided by the actuators 31 which are effecting the print-on/print-off position themselves. Quick-acting control valves, which are not specifically represented, are provided for this in the hydraulic system that is located upstream of the actuators 31. For the modulation of the existing pressure, with a higher pressure exceeding the contact pressure, for charging with the signal/force pulse, the actuators 31, or the quick-acting control valves, are again connected with a regulating and/or control arrangement 57, as shown in FIG. 10.

In a second embodiment, it is possible to provide, in addition to the actuators 31 which are effecting the print-on/print-off position, further actuators 40, such as, for example, piezo actuators 40, which act in a highly dynamic manner and which also act on the bearing block 16. They can be integrated, as indicated by dashed lines in FIG. 7 into the tappets of the pistons of the actuator 31, for example. In the case of two different actuators 31, 40, the low-frequency actuating movements are performed by the actuators 31 effecting the print-on/print-off positions, and the high-frequency movements/force pulses, for counteracting the vibrations, are performed by other actuators 40, or 23. The additional piezo actuators 40, or 23 are again connected, for example, with a regulating and/or control arrangement 57 for modulating the contact force.

The solution disclosed in the second preferred embodiment, as shown in FIGS. 6 to 8, of the vibration damping, with or without an additional piezo actuator 40, can be advantageously employed for damping vibrations, because the direction of the pressure forces between two cylinders 02, 03 placed against each other, and the movement direction in the bearing unit 06 lie in one line. In embodiments customary up to now, in which the print-on movement is performed by the use of eccentric bearings, the feed movement does not take place in the same direction as the pressure forces. In connection with the linear bearing, as depicted in FIGS. 3 to 5, or in FIGS. 6 to 8, the feed movement occurs in the same direction as the pressure forces. This makes a force pulse possible, which acts in the same direction as the interfering pulse or groove beat, and thus causes vibration damping.

In an advantageous variation, which is only indicated in FIG. 7, of the second embodiment of the second preferred embodiment of the present invention, using different drive mechanisms for actuating movement for vibration compensation, the bearing block 16 in FIG. 4 having actuators 23, but without the actuating drive from FIGS. 3 and 5 can be arranged in the bearing arrangement 06, whose actuating movement is driven by the actuators 31. In this case the gear 11 in FIGS. 3 and 5, for example, is omitted. Bringing the cylinders 02, 03 into/out of contact now takes place, for example as in FIGS. 6 to 8, by the use of at least one actuator 31. By way of example, one of the one or of the several actuators 23, which are integrated into the bearing block 16, has been indicated by dashed lines in FIG. 7. What was said with regard to the arrangement of the actuators 23 of the first example should be employed in the same manner as what was said with regard to the bearing arrangement 06, but omitting the actuator 40, of the second example.

Figure 9:
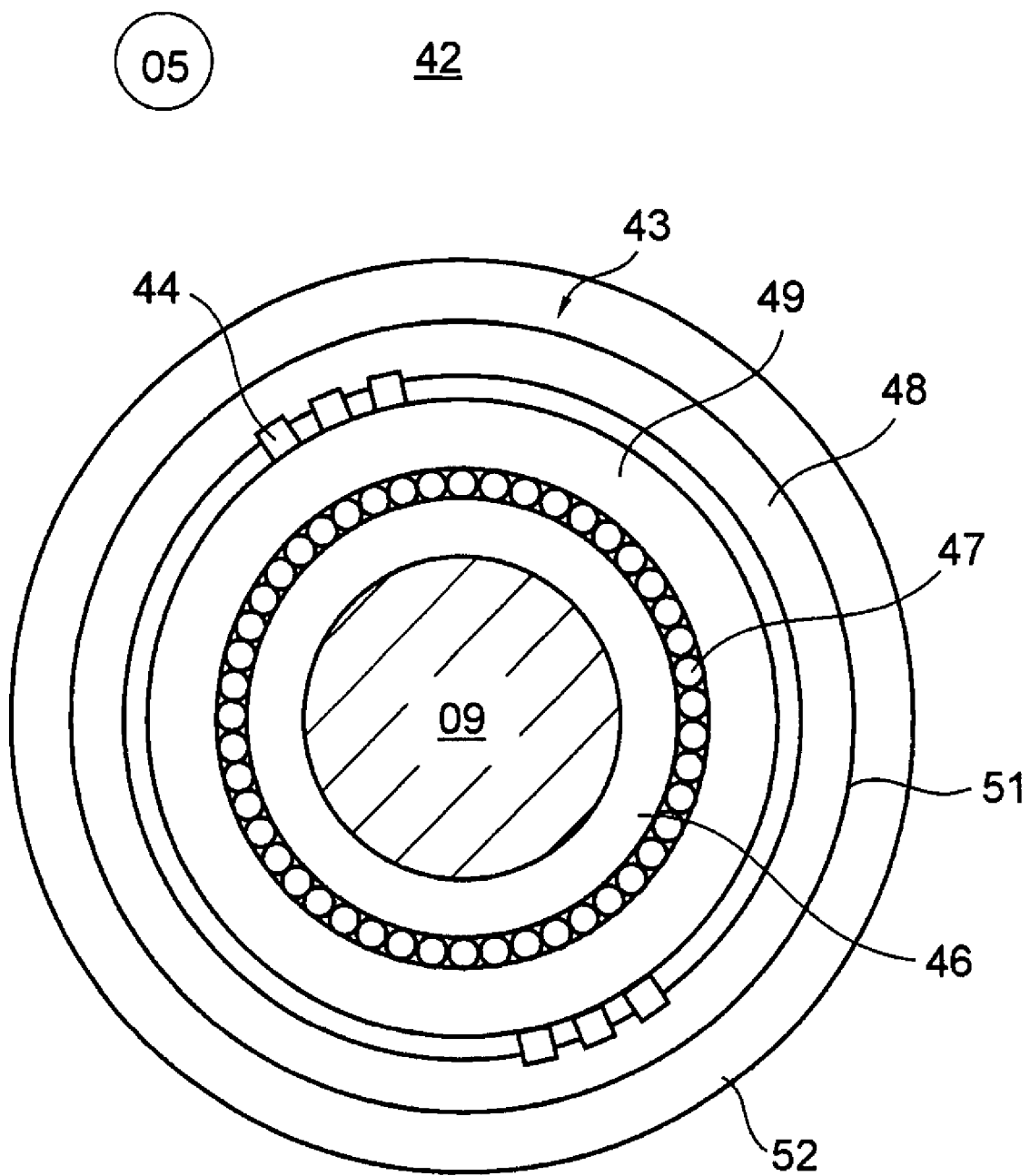

In a third embodiment of the present invention, as depicted in FIGS. 9 and 10, a bearing arrangement 42 for receiving the journals 09 of the cylinders 02, 03 is embodied as a customary radial bearing 42, for example a multi-ring radial bearing 42, which is arranged on or in the lateral frame 07, 08. The bearing arrangement 42 can be embodied as an eccentric bearing for the purpose of placement of the supported cylinders into and out of contact, wherein the shaft of the seated cylinder 02, 03 is displaced in the radial direction by pivoting an eccentric outer ring of the seated cylinder 02, 03. This occurs, for example, by the use of a drive mechanism, which is not specifically represented, such as, for example, an actuating drive for the into/out of contact position, such as mechanically or pneumatically, for example, via appropriate gears. The bearing arrangement 42 has at least one ring 43, divided in FIGS. 9 and 10, such as, for example, an eccentric intermediate ring 43, and at least one ring 46, such as, for example, an inner ring 46, between which rolling bodies 47, or sliding faces, permit relative rotation. For example, the divided intermediate ring 43 has a ring 48, for example an eccentric one, located further outward, and a ring 49 located further inward. For example, the eccentric ring is pivotably seated in an outer ring 52 via a radial bearing 51, such as, for example, a sliding bearing or a needle bearing 51. Actuators 44 are arranged in the structure of the bearing unit 42 between at least two adjoining rings 43, 46, 48, 49, 52, in this case between the two rings 48, 49 of the divided intermediate ring 43 which actuators 44 exert a force in the radial direction between the rings 43, 46, 48, 49 and can cause a relative, possibly infinitesimally small movement connected with this. In the depicted example the intermediate ring 43 is configured in two parts and, between the two rings 48 and 49, houses several, at least two, such actuators 44, and in particular houses at least two piezo elements 44, which are spaced apart from each other in the circumferential direction. These actuators 44 are in signal connection with a regulating and/or control arrangement 57 for being acted upon. The regulating and/or control arrangement 57 contains, for example, an algorithm, which provides the actuator 44 with a signal progression.

Preferably, at least two actuators 44 are arranged, one of which is located, for example, in the angle area of the nip location 05, to the nearest cylinder 02, 03, which nip location is here merely indicated by the encircled reference numeral 05, and the other one is located opposite the first. However, in addition to, or instead thereof it is possible to arrange groups of actuators 44, which respectively are located in pairs opposite each other, in a defined angular area around, and opposite to the nip point 05. In this case, these pairs of oppositely located actuators are, for example, each oppositely acted upon to make possible the movement of the inner ring 46, or of the journal 09. The arrangement of several pairs of actuators 44, which are offset, with respect to each other in the circumferential direction, makes it possible to affect the vibration "turning through" the nip point 05 by the use of force pulses, even in the range of decaying after-vibrations, because the vibration level exited by the groove beat rotates along with the cylinder 02, 03, in contrast to the intermediate ring 43.

In addition to several actuators 44 distributed in the circumferential direction, actuators 44 can also be spaced apart from each other in the axial direction of the bearing. Depending on the control, it is possible, by the use of this arrangement of actuators 44, to apply a bending moment to the inner bearing ring 46 and therefore also to the journal 09.

The chronological course of the triggering of the actuators 44 can be, for example, a function of the number of revolutions, as will be discussed below, and possibly additionally as a function of parameters, such as temperature and/or contact force of the cylinders 02, 03, and/or the behavior of the rubber blanket. In this case, triggering of the actuators 44 takes place controlled, for example with regard to the time and possibly with regard to the signal shape, correlated with the angular position of the respective cylinder 02, 03. The finding of a respectively optimal, or sufficient, signal level can also be the subject of an adaptive regulating process, as discussed below.

With respect to their transitions, either on or off, triggering of the actuators 44 can take place by the use of parabolic, sinusoidal, or other functions of higher order.

A variation of the bearing arrangement 42 shown in FIG. 9, is schematically represented in FIG. 10 wherein, for example in an intermediate space which is located in a half space between the outer and inner ring 48, 46 and pointing toward the nip point 05, an actuator 44, which is extending over a larger angular area of, for example, 45° to maximally 90°, is arranged. An actuator 44, extended in this way or, as indicated in FIG. 10, several such actuators 44 positioned side-by-side, can be arranged in the area opposite the nip point 05 between the inner and outer rings 48, 49. As indicated, intermediate spaces 55 should be provided in the circumferential direction between the actuators 44 to be associated with the side, or half space and those to be associated with the opposite side, so that the inner ring 49 remains movable within defined limits in the direction toward the nip point 05. The actuators 44 to be associated with the nip point 05 and with the opposite side are again, as mentioned above, oppositely triggered.

With very slim cylinders, in addition to the problem of groove beat, the problem of static cylinder bending, because of compressive strain, occurs. Because of this, the print blanket compression is reduced in the center of the barrel, which can lead to ink transfer problems. On the other hand, torque can occur in the course of the meshing of two cylinder spur wheels when the cylinders 02, 03 are moved toward each other and a tangential movement component exists. For example, the latter can be the case if the cylinders 02, 03 of the printing group 01 are arranged not linearly, but in an n-, u- or z-shape.

Figure 11:
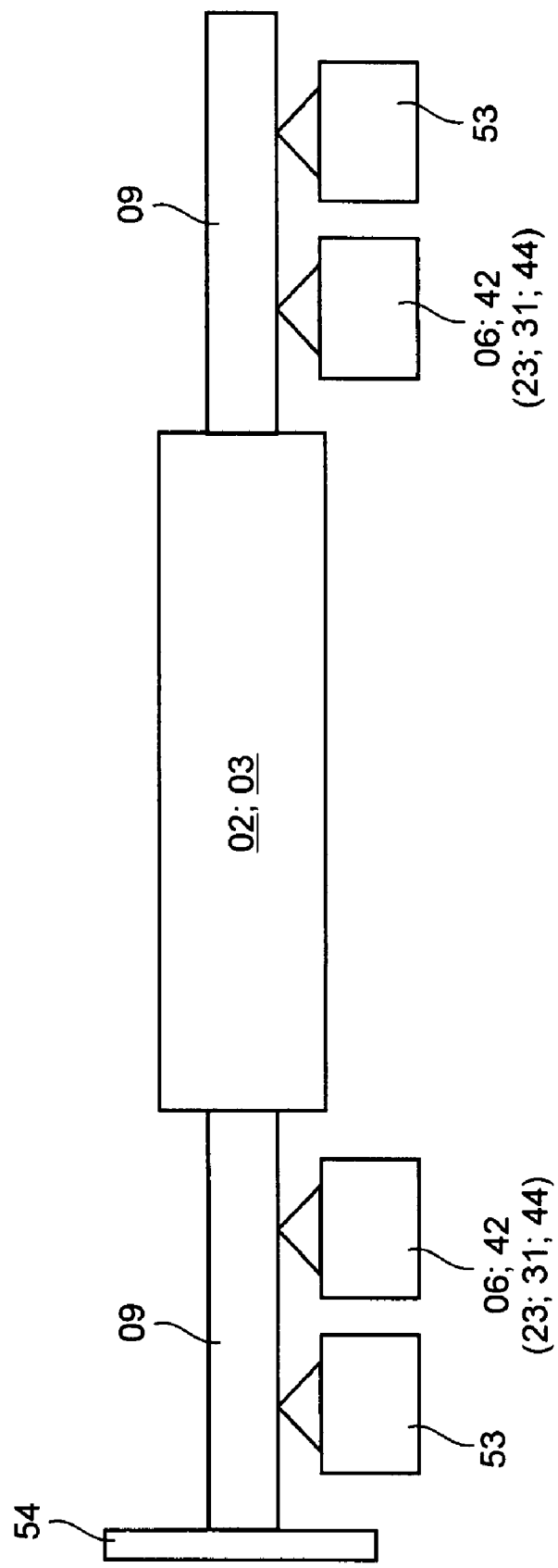

To compensate for bending, in a further development of the present invention, as depicted in FIG. 11 of one of the embodiments, a double bearing is used, i.e. a bearing with two respectively axially spaced apart bearing locations, on each journal 09. In this case, the respective bearing that is seated closer to the cylinder barrel, is preferably embodied in the manner of a bearing arrangement 06, 42 with a highly dynamic actuator 23, 31, 44; i.e. a "dynamic bearing" 06, 42 in the discussion that follows, and which counteracts the vibration. The farther removed bearing, with respect to the cylinder barrel, is embodied as a bearing arrangement 53 without a highly dynamic actuator 23, 31, 44; i.e. a "fixed bearing" 53 in the discussion that follows. However, both types of bearing have a print-on/print-off adjustment. For example, the fixed bearing 53 can be configured in the same way as the dynamic bearing 06, 42, except for the actuator 23, 31, 44. The dynamic bearing 06, 42 can be embodied in the manner of one of the above described bearing units 06, 42, in accordance with FIGS. 3 to 10. In the case of the bearing arrangement 06 in accordance with FIGS. 6 to 8, the fixed bearing 53 can also be embodied corresponding to the bearing unit 06, but the quick-acting control valves can be omitted.

The journal 09 between the two bearing places, or bearing units 06, 42, 53, of a double bearing is advantageously selected to be relatively less rigid. This means that the distance between the two bearing locations is embodied to be large and/or that the journal 09 is provided with a comparatively small diameter. In the course of the radial movement by the actuator 23, 31, 43 no large additional forces are imparted by the second bearing unit 53 acting as a support bearing. However, a thick, short journal 09 is advantageous over a long, thin journal 09, since the former has a greater torsional rigidity, along with the same bending softness.

If a gear wheel 54 should be arranged on the journal 09 for rotatorily driving it, as depicted schematically in FIG. 11, it should preferably be arranged close to the bearing unit 53, while being located farther outward on the journal 09. Because of the nearness of the gear wheel 54 to the "fixed" bearing 53, there is a reduced introduction of a torque into the cylinder 02, 03 via the tooth engagement of adjoining gear wheels 54.

A static bending moment can be introduced by changing the radial position of the two adjoining bearings 06, 42, or 53 in order to compensate for the bending of the cylinder. In one embodiment, this change can take place by the use of a static deflection of the actuator 23, and in particular a piezo actuator 23, on which the dynamic deflection is superimposed for vibration reduction. In another embodiment, which is particularly advantageous in connection with the linearly movable bearing blocks 16 of the first and second preferred embodiments, the introduction of the static bending moment takes place by a displacement of the bearing blocks 16 of the outer, and in particular of the fixed, bearings 53 in relation to the inner, and in particular the dynamic, bearings 06, 42.

In this case, a force measurement in both bearings 06, 42, 53 of the double bearing is advantageous for adjusting the counter-bending.

When embodying the bearings 06, 53 with linearly movable bearing blocks 16 and including a mechanism with an actuating drive 21 for the movement into/out of contact, which performs path-defined contact, such as, for example, the bearing unit in FIGS. 3 to 5, the amount of the bending moment introduction required for compensating the static bending can be determined, for example as follows.

Initially, the bearing blocks or carriages 16 of all four bearing units 06 are displaced, for example synchronously from the print-off position into the print-on position. It is possible to calculate the acting linear force, as well as the already acting counter-bending moment, from the resulting force change at the outer and inner bearing 06, 53 by the use of the cylinder geometry, as well as by the distance between the outer and inner bearing 06, 53. The still required additional counter-bending movement can be generated by the displacement of only the bearing blocks 16 of the outer bearings 53 in the print-off direction by the use of journal bending.

A particularly suitable method, which however, is also advantageous in connection with a device suitable for this, for example in accordance with example one, two or three and, if desired, the double bearing arrangement 06, 42, 53 from FIG. 11 for active vibrations compensation is provided in what follows, which method meets the following requirements:

the quality of compensation should be unaffected by the following operational parameters: type of printing blanket, feed, such as may be caused by underlays and/or printing blanket thicknesses, the concept should be applicable, to the greatest extent, without changes, to a wide range of types of presses, such as newspaper or job printing and formats, such as double and single circumference, the vibrations which are caused by groove or channel beats should be optimally minimized at all numbers of revolutions. In this case, optimal does not necessarily mean complete elimination. Instead, the goal is to keep vibrations so low that stripes will no longer be noticed in the printed product, the vibrations should be minimized, or eliminated, over the entire printed length.

These requirements are met by one or by several of the following points:

an actuating device which introduces force or bending moments, whose strength can be preset, into the bearings via electrical signals, by the use of which, the bending of the cylinder can be dynamically, or statically, changed. In this case, the introduction of these force or bending moments substantially takes place only as long as the groove beat lasts.

A sensor arrangement which is capable of detecting the strength of existing vibrations, and in particular the strength of bending vibrations and the first and second harmonic bending vibrations, and to convert that detected strength into electrical signals.

An adaptive control, which derives the preset actuator signals for the next roll-over cycle from the actual sensor signals and from previous sensor signals. If it is necessary to reduce several forms of vibration, the goal is not to completely eliminate all amplitudes, but to reduce all these vibrations to a size which is of no relevance for the printing operation.

First, in a preparatory step, a force progression, as a function of time, or of the angle of rotation, to be expected is determined on the basis of the geometric dimensions with respect to the nip width to be expected, or desired, for the type of printing and for the known groove width. Such a functional progression, or connection $F_{0(\phi)}$, can be recreated with sufficient accuracy through theoretical considerations. An absolute value can be taken into consideration via a scaling factor K. The function or force progression should be capable of being differentiated once, preferably at least at its rising and falling flanks, and scaled by a factor. By the use of a function regarding the theoretically resulting force progression of the groove beat derived in this way, it is possible, together with theoretic data from dynamic machine calculations, to obtain statements regarding the shape of characteristic vibration modes and mode amplitudes to be expected.

The following should now be noted for an explanation of the terms. In a system with coupled cylinders, several vibration modes always occur, in which the bent shapes of the respective individual cylinders are very similar, and which "merely" differ with regard to the phase relationship of the cylinder movements with respect to each other. In the present situation, these similar vibration modes should be called "mode groups", for example. As a rule, the frequencies of these modes of the "mode groups" are located comparatively close together, for example, all in the range 150 . . . 200 Hz.

In this connection, the terms "base vibration", "first harmonic vibration", "second harmonic vibration", etc. are not simply meant to be the modes, inclusive of the different modes of a "mode group" ascending in accordance with the frequency. In the sense indicated here, the order takes place in accordance with mode groups, i.e. by first, second, third harmonic vibration the first, second, third mode group is meant. This would then analogously correspond to something similar to the modes of a non-coupled cylinder.

Therefore, those modes of vibration are to be understood as base vibrations, in which the dynamic bending line of the individual cylinder, between the bearing points, extends substantially mirror-symmetrical with respect to the barrel center and has no vibration node on the barrel.

All those vibration nodes are to be understood as first harmonic vibration, in which the dynamic bending line of the individual cylinders between the bearing points extends substantially point-symmetrical with respect to the barrel center, and has exactly one vibration node on the barrel.

All those vibration nodes are to be understood as second harmonic vibration, in which the dynamic bending line of the individual cylinder between the bearing points extends substantially mirror-symmetrical with respect to the barrel center and has exactly two vibration nodes on the barrel.

As a rule, the vibration frequencies of the mode groups are farther separated between each other than are the vibration frequencies within the mode group.

A further advantageous embodiment of the detection/determination of the force progression of the groove beat by force measurement during quasi-static roll-over, i.e. below the excitation to vibration, is an alternative to the purely theoretical, or geometric considerations determination of the shape of the force progression of the groove beat (connection $F_{0(\varphi)}$). For example, this can take place at machine speeds of less than 20 m/min or, for example, at a draw-in speed at 3 to 8 m/min machine speed, which equals a circumferential speed of the cylinders 02, 03.

Now, for the chronological actuator force progression, the groove beat force progression assumed on the basis of the above mentioned method, either purely theoretical or by the use of measurement, is preset, except for a scaling factor K determining the strength, and is stored in a control and/or regulating arrangement 57 or in a force progression generator 59. In addition to appropriate memory and/or computing capabilities means, the control and/or regulating arrangement 57 can also contain the force progression generator 59. Possibly, when knowing the transmission function of the actuator 23, 31, 44 for the preset output signal, the backward distortion can be taken into consideration in order to obtain the desired progression of the force at the actuator 23, 31, 44 in the end. Here, it is possible to understand the actuator force progression to be equivalent to an actuator force angle position progression, since these have a direct relationship via the machine speed. Preferably, a chronological progression is preset for the actuator 23, 31, 44 which, however, has been formed by using the preset actuator force angle position progression, taking the machine speed, or the number of revolutions, etc., into consideration.

From this chronological progression, a chronological actuator progression, or an actuator force angle position progression is formed, regardless of the way of obtaining the groove beat force progression, and is stored as a function of the angle, either as discrete values from a table or as a mathematical function.

The basis of the further method is the requirement that, in the course of the minimization of the vibration, vibration modes which are caused by the groove beat, as well as by the actuator 23, 31, 44 itself, are entered. For example, this takes place in that, in the course of the calculation of the maximum amplitudes on the barrel, the corresponding modes are also considered.

The further way of proceeding will be made clear by the use of the example of FIG. 12. In the course of operation, a measurement is taken on at least one location of the cylinder 02, 03, including the journal 09 of the vibration, or of the amplitude at this location, or of a value representing the vibration or the amplitude at this location, by the use of a sensor 56, such as, for example, a mechanical force transducer, or an optical measurement. However, this only represents the deviation at this particular location and does not yet provide concrete information regarding amplitudes being experienced anywhere on the barrel of the cylinder 02, 03.

In the next step, the maximal amplitude being experienced anywhere on the barrel of the cylinder 02, 03, which is to be iteratively minimized, is determined by calculation, such as, for example, by the use of a calculation algorithm in a computing component of the control and/or regulating arrangement 57. In an advantageous embodiment, it is possible, for this purpose, to evaluate the measured signal by the use of appropriate filters regarding the amplitudes of the main modes involved, such as the basic vibration and/or the first harmonic vibration and/or the second harmonic vibration in the above-mentioned sense). The maximum amplitude being experienced anywhere on the barrel is calculated from the measured, or filtered, mode amplitudes of the basic vibration or groove beat, and of the second harmonic vibration or vibrations, in the above mentioned sense additionally excited by the actuator 23, 31, 44. This is possible by knowing the mode form of the characteristic modes, which can be calculated in a machine-dynamic manner, as discussed above).

Now the actuators 23, 31, 44 are triggered by the control and/or regulating arrangement 57 in accordance with the preset chronological actuator force progression or by the actuator force angle position progression. Thus, this force-time progression is predetermined and, in contrast to pure regulation, or action only in regard to a measured reaction, provides pre-control. It can now be the goal of a following adaptive regulation, for example, to find the optimum scaling factor K or signal strength. No curve shape of chronological progression is generated by the regulation. Only the strength of the preset progression is matched. The forces which are introduced into the different actuators 23, 31, 44 of a cylinder 02, 03 preferably always have the same relationship with each other in connection with a given groove beat. These relationship numbers can be calculated from machine-dynamic calculations of the "printing group with actuator" system, and can then be stored. The common pre-factor, i.e. the scaling factor K, is determined by the use of the iterative optimization in such a way that the above-mentioned maximum amplitude becomes minimal.

Preferably, the force introduction takes place only within the narrow time window of the groove roll-over. The preset chronological actuator progression, or the actuator force angle position progression, has been correspondingly selected.

The information regarding the rotational state of the cylinders 02, 03 is, for example, obtained from a sensor 58, such as, for example, an angle encoder as shown schematically in FIG. 12, which detects the cylinder's angular position. The length of time of the groove roll-over can therefore be detected on the basis of the structural requirements by the use of a groove beat starting angle and a groove beat ending angle. The time of the actuation is therefore controllable as a function of the angle of rotation position.

As the initial feedback value for the optimization, the vibration progression of the cylinder vibrations is detected by the suitable sensor 56, as will be discussed below, starting with the starting angle >groove beat ending angle, over a given length of time, or until a given sensor end angle, prior to the third groove beat taking place. The signal so obtained is analyzed regarding the strength of the existing vibrations. This is advantageously accomplished by the use of digital signal processing which, for example, determines the difference between successive extreme values, and, as a result, provides the absolute amount of the first one of these differences, or the maximum of the absolute amount of these values. In what follows, this result will be called total amplitude.

In principle, the method can be separately applied to any arbitrary modes. However, in an advantageous embodiment, only the amplitude of the groove beat basic mode or group is entered, as well as possibly, also the mode amplitude of the second harmonic, or non-staggered groove, as a function of the type of force introduction and, with staggered grooves, of the first harmonic vibration entered in the consideration.

In accordance with what was discussed above, it is required to find the suitable scaling factor K for suppressing groove beats which, within the scope of the adaptive-iterative regulation, is advantageously iteratively optimized with the aid of the measured amplitude of the base vibration (A0) and of the second mode (A2).

It is possible to proceed as follows for iteration:

Initially, a start is made with a fixed starting value for K, for example,
- either K0=0, i.e. no actuator effect,
- or a fixed reference value $K_{REF}$,
- or the value of the previous operating state.

Subsequently, the two mainly existing mode amplitudes, such as, for example, A0 and A2 are measured, or are filtered, and the above-mentioned maximal amplitude, which theoretically results at any arbitrary location on the cylinder 02, 03, is calculated.

The scaling factor K is increased by an amount $\Delta K$. In principle, the amount of $\Delta K$
- can either be fixedly preset,
- or can be the goal of optimization in the meaning of an adaptive step width control.

The fixed presetting represents an advantageous way of proceeding. For example, the amount of $\Delta K$ is fixed in the following manner:

A vibration excitation of the cylinders 02, 03 takes place by an introduction of a force into the actuator without a groove roll-over, wherein K=$\Delta K$. The size of the total vibration amplitudes of the relative cylinder movement that is formed by this, in the vibration-sensitive nip points, should clearly lie below the critical threshold value for the creation of vibration stripes, such as, for example, by a safety factor >5. Since the amplitudes being experienced can be pre-calculated on the basis of machine-dynamic considerations, this determination is always possible to start with. It is alternatively also possible to obtain this value by measuring the vibration amplitudes, for example in the course of the start-up of the machine. So that not too many iterations are required, for example with the start value selection as K0, the safety factor should also not be selected to be too large, for example <10.

In the subsequent iteration step, the maximal mode amplitudes, which are calculated as described above from the measured ones of the successive steps are compared with each other.

A decision is then made, as a function of the algebraic sign of the amplitude change, i.e. the difference between the last and the newly determined maximum amplitude, whether an algebraic sign change of $\Delta K$ is required, and the scaling factor K of the force introduction is changed to K+$\Delta K$. The iteration step "I" terminates with this, and the step "I"+1 starts. The length of time for an execution of an iteration step advantageously is a rotation cycle of a cylinder. By the selection of the amount of $\Delta K$, it is assured that the vibration minimum can be continuously maintained, even at velocity changes with typical acceleration of >>40,000 rev/h/min.

Since the characteristic modes of the groove beat are characteristic system vibrations, it is not necessary
- to detect the vibrations at all cylinders 02, 03. As long as the coupling between the cylinders 02, 03 is sufficiently strong, i.e. the cylinder rigidity therefore is low in comparison with the printing blanket spring constant, it may even be sufficient to detect the vibrations only on one cylinder 02, 03 in order to obtain a sufficiently strong measurement signal. However, as a rule it will be necessary to perform the detection at a cylinder which is directly involved in the groove beat; i.e. one of the two cylinders forming the nip in which groove beating takes place,
- to employ more than one sensor 56 for detecting a mode, because the amplitude conditions in the entire system are unequivocally determined already by the amplitude at one location. Regarding the location of the detection, it is required that it does not lie inside a vibration node of corresponding measuring strength. In the interest of a sufficiently strong measuring signal, a vibration maximum is particularly advantageous during a path measurement. In case of the characteristic groove beat mode, this would approximately be the barrel center. However, this location is disadvantageous for structural space aspects, as well as with regard to holding means, possible sensor vibrations. In case of not too great a bearing rigidity, a measurement in the bearing, for example in the bearing arrangement 06, 42, or in the vicinity of the bearing, is possible,
- to employ a separate sensor 56 for each mode, because it is possible to obtain the characteristic modes from a signal by filtering or bandpass. However, this is problematical when the characteristic frequencies are so closely adjacent that they cannot be separated because of the edge steepness of the filter, or because the measuring signal of the individual modes is falsified by too great an edge steepness. In this case, it is suggested to link the signals from two, or more signals by the formation of linear combinations of the measuring signals in order to obtain the individual modes separately.

For suppressing vibrations which are not part of the characteristic groove beat modes, such as, for example, vibrations of the frame, as well as other interferences, such as, for example, true running/out-of-balance, or sensor noise, it is, in general, advantageous to use a high pass or a bandpass filter, which only lets characteristic groove beat modes through.

With an indirect printing process, such as, for example, offset printing, in which the transfer cylinder 02 has grooves, it is advantageous, in order to minimize the number of required sensors 56, to detect the vibrations only at the transfer cylinder 02, since it directly takes part in the groove beats at the two nips, the forme cylinder-transfer cylinder nip and the transfer cylinder-counter-pressure cylinder nip.

Because of the finite rigidity of the actuators, the bearing rigidity is reduced, in comparison with customary bearing seating, for example directly in the frame, so that a measurement is also possible in the area of the bearing arrangement 06, 42. Alternatively, a measurement of the bearing forces, such as, for example, by the use of wire strain gauges, or via the actuator 23, 31, 44 itself, is possible. In the case of the introduction of a bending moment via the journal 09, it is, in principle, also possible to detect, for example the bending moment, by wire strain gauges on the journal 09. However, in that case, the signal transmission of the detector at the rotating journal 09 represents an increased outlay.

With staggered grooves such as grooves which only extend over a portion of the cylinder length, but which are offset from each other in the circumferential direction, detection at both front-side bearing locations, such as, for example, at bearing arrangements 06, 42, is advantageous since, by forming the sum of the two signals, it is possible to obtain the basic vibration and the even-numbered harmonic vibrations and, by forming the difference, the first harmonic vibration and the odd-numbered harmonic vibrations. In this case, it is possible to obtain the amplitudes of the modes contained in these two signals, possibly again by the use of the above-mentioned filter methods. The mode amplitudes can be determined in this way.

Advantageous embodiments of the actuator 23, 31, 44 are:
- large dynamics, rise/fall within the length of the groove beat. The definitions of the force progressions of the groove beat and actuators with scaling factors K represent "minimal" dynamics during a predetermined time length, length of groove beat. In connection with customary narrow grooves of 3 mm width since results in a rise/fall within a length of a groove beat of 0.002 s, by rapidly running machines also less than or equal to 0.00019 s. If vibration amplitudes which are impermissible in connection with printing technology appear only at low numbers of revolutions, these requirements can be reduced by a factor of 2.3, i.e. the time required for rise/fall can be longer, the force and path requirements are a function of the type of force introduction. In general, triggering of the actuators 23, 44, 31 will take electrically by a control voltage or current, for example by a d/a converter. In this case, it can be advantageous to already take into consideration the transmission behavior of the actuators themselves, based on mass inertia or harmonic actuator frequencies and/or of the triggering unit or amplification cut-off in the course of specifying the control voltage or current by the use of reverse calculation, so that the desired force progression, in accordance with the specifications, is achieved.

The actuators 23, 31, 44 to be employed for active vibration damping preferably have a very rapid response time, typically with a reaction for a cycle >100 Hz, and in particular >200 Hz, and a high degree of rigidity.

Preferably, a distance of at least 20 µm, and advantageously <40 µm, must be provided per actuator.

Different actuators 23, 44 are preferably used for vibration reduction than the drive mechanisms responsible for the in/out-of contact movement, as discussed in the first and third examples.

In connection with the embodiment of a common drive mechanism for vibration compensation and the in/out-of contact movement, the actuator 31 employed there must have sufficiently rapid reaction cycle times for short paths, as discussed in the second example.

In place of the above-mentioned piezo actuators 23, 44, it is also possible, in connection with the above-mentioned examples, to employ actuators 23, 44 which are embodied as electromagnets.

While preferred embodiments of a method and devices for reducing vibration, in accordance with the present invention, have been set forth fully and completely hereinabove, it will be apparent to one of skill in the art that various changes, in for example, the specific structure of the cylinders, the type of web being printed, and the like could be made without departing from the true spirit and scope of the present invention which is accordingly to be limited only by the appended claims.

What is claimed is:

1. A device for reduction of vibration in a cylinder of a web-processing machine comprising:
   a cylinder barrel;
   at least one cylinder journal on said cylinder;
   a linearly movable bearing block supporting said cylinder journal;
   a radial bearing in said linearly movable bearing block and receiving said cylinder journal;
   a vibration countering actuator in said linearly movable bearing block, said vibration countering actuator being movable with said linearly movable bearing block, said vibration countering actuator being adapted to apply a vibration countering force to said cylinder journal; and
   at least one spring element in said linearly movable bearing block, said at least one spring element being movable with said linearly movable bearing block and being adapted to apply a restoring force to said cylinder journal.

2. The device for reduction of vibration of claim 1 further including
   a sensor adapted to determine a value defining one of a vibration and a chronological amplitude progression and
   a control and regulating arrangement containing at least one bandpass filter and a calculating algorithm adapted to determine a maximal vibration amplitude in said cylinder from a measured vibration amplitude, said control and regulating arrangement further storing an actuator force angle position progression, both said sensor and said vibration countering actuator being in signal connection with said control and regulating arrangement.

3. The device of claim 1 further including a drive mechanism for said cylinder and adapted to move said cylinder between a print-on position and a print-off position, said drive mechanism being different from said vibration countering actuator.

4. The device of claim 3 wherein said drive mechanism includes a gear and an actuator motor.

5. The device of claim 3 wherein said drive mechanism includes at least one force controllable movement actuator which can be operated by a pressure means.

6. The device of claim 1 wherein said vibration countering actuator is a piezo actuator.

7. The device of claim 1 wherein said linearly movable bearing block is a structural unit and includes said radial bearing and further includes bearing elements usable to accomplish said linear movement of said bearing block.

8. The device of claim 7 further including at least one gear in said linearly movable bearing block and usable to shift said linearly movable bearing block.

9. The device of claim 8 including a gear actuating device situated remote from said linearly movable bearing block and connected to said gear and further including means to convert an actuating movement applied to said gear actuating device into a linear movement of said linearly movable bearing block.

10. The device of claim 1 further including a control and regulating arrangement adapted to store an actuator force angle position progression, said vibration countering actuator being in signal connection with said control and regulating arrangement.

11. The device of claim 10 further including a sensor usable to provide a value defining a vibration at a location of said sensor, said sensor being in signal connection with said control and regulating arrangement.

12. The device of claim 10 further including a force progression generator adapted to trigger said vibration countering actuator.

13. The device of claim 1 further including a force progression generator adapted to trigger said vibration countering actuator.

14. The device of claim 1 wherein said at least one spring element is a spring package in said bearing block.

15. The device of claim 14 wherein said spring package has an effective direction oriented in a radial direction of said cylinder journal.

16. The device of claim 1 wherein said vibration countering actuator has an effective direction of actuation oriented in a radial direction of said cylinder journal.

* * * * *